US010031648B2

United States Patent
Weiss et al.

(10) Patent No.: US 10,031,648 B2
(45) Date of Patent: Jul. 24, 2018

(54) SYSTEMS AND METHODS TO OBFUSCATE MARKET DATA ON A TRADING DEVICE

(71) Applicant: TRADING TECHNOLOGIES INTERNATIONAL INC., Chicago, IL (US)

(72) Inventors: Thomas Jeffrey Weiss, Skokie, IL (US); Patrick Joseph Rooney, St. Charles, IL (US); William Tigard Baker, Hoffman Estates, IL (US)

(73) Assignee: Trading Technologies International, Inc., Chicago, IL (US)

( * ) Notice: Subject to any disclaimer, the term of this patent is extended or adjusted under 35 U.S.C. 154(b) by 731 days.

(21) Appl. No.: 14/588,163

(22) Filed: Dec. 31, 2014

(65) Prior Publication Data

US 2016/0188886 A1 Jun. 30, 2016

(51) Int. Cl.
| | |
|---|---|
| *G06Q 40/00* | (2012.01) |
| *G06F 3/0484* | (2013.01) |
| *G06Q 40/04* | (2012.01) |
| *G06F 21/62* | (2013.01) |
| *G06F 21/84* | (2013.01) |
| *G06F 1/16* | (2006.01) |
| *G06F 3/01* | (2006.01) |

(52) U.S. Cl.
CPC ........ *G06F 3/0484* (2013.01); *G06F 21/6245* (2013.01); *G06F 21/84* (2013.01); *G06Q 40/04* (2013.01); *G06F 1/163* (2013.01); *G06F 3/011* (2013.01); *G06F 2221/2125* (2013.01)

(58) Field of Classification Search
CPC ........ G06Q 40/00; G06Q 40/04; G06Q 40/06; G06F 3/0484; G06F 21/6245; G06F 21/84; G06F 1/163; G06F 3/011; G06F 2221/2125
See application file for complete search history.

(56) References Cited

U.S. PATENT DOCUMENTS

| | | | | |
|---|---|---|---|---|
| 6,847,489 | B1 | 1/2005 | Wu | |
| 8,269,774 | B2 * | 9/2012 | Buck | G06Q 30/06 345/440 |

(Continued)

OTHER PUBLICATIONS

International Search Report and Written Opinion of International Application No. PCT/US2015/064947, dated Feb. 11, 2016 (dated Feb. 26, 2016).

*Primary Examiner* — Lalita M Hamilton
(74) *Attorney, Agent, or Firm* — McDonnell Boehnen Hulbert & Berghoff LLP

(57) ABSTRACT

Systems and methods to obfuscate market data on a trading device are disclosed. An example method includes receiving market data related to a tradable object at a first computing device, generating, by the first computing device, a trading interface to present the market data to a trader and reconfiguring the trading interface from a first mode to a second mode in response to a privacy command supplied by the trader via the first computing device. The first computing device is to obfuscate the market data presented by the trading interface when in the second mode. The example method includes receiving, by a second computing device, the obfuscated market data in response to the privacy command and generating, by the second computing device, a private interface to present the obfuscated market data to the trader in response to the privacy command.

42 Claims, 15 Drawing Sheets

(56) References Cited

U.S. PATENT DOCUMENTS

| | | | |
|---|---|---|---|
| 8,533,104 B2* | 9/2013 | Cheng | G06Q 40/04 |
| | | | 705/37 |
| 8,652,798 B2* | 2/2014 | Gimzewski | B82Y 35/00 |
| | | | 435/29 |
| 8,688,566 B2 | 4/2014 | Bartko et al. | |
| 8,733,952 B2 | 5/2014 | Jung et al. | |
| 8,887,044 B1 | 11/2014 | Goodspeed et al. | |
| 9,038,189 B1* | 5/2015 | Stevens | G06F 21/60 |
| | | | 726/26 |
| 9,136,938 B1* | 9/2015 | Babich | H04B 7/22 |
| 9,141,188 B2* | 9/2015 | Fein | G06F 3/011 |
| 9,652,798 B2* | 5/2017 | Globe | G06Q 30/0631 |
| 2009/0177591 A1* | 7/2009 | Thorpe | G06Q 40/04 |
| | | | 705/36 R |
| 2012/0007868 A1* | 1/2012 | Buck | G06Q 30/06 |
| | | | 345/440.1 |
| 2012/0187187 A1 | 7/2012 | Duff et al. | |
| 2012/0246055 A1 | 9/2012 | Schlifstein et al. | |
| 2013/0218739 A1* | 8/2013 | Kmiec | G06Q 40/04 |
| | | | 705/37 |
| 2014/0101555 A1* | 4/2014 | Fein | G06F 3/048 |
| | | | 715/733 |
| 2014/0143116 A1 | 5/2014 | Mauro et al. | |
| 2014/0297503 A1 | 10/2014 | Murphy et al. | |
| 2015/0088723 A1* | 3/2015 | Acuna-Rohter | G06Q 40/04 |
| | | | 705/37 |
| 2017/0148094 A1* | 5/2017 | Madle | G06Q 40/04 |

* cited by examiner

SYSTEMS AND METHODS TO OBFUSCATE MARKET DATA ON A TRADING DEVICE

BACKGROUND

An electronic trading system generally includes a trading device in communication with an electronic exchange. The trading device receives information about a market, such as prices and quantities, from the electronic exchange. The electronic exchange receives messages, such as messages related to orders, from the trading device. The electronic exchange attempts to match quantity of an order with quantity of one or more contra-side orders.

Trading devices typically display market data and other trading information to a user via a screen or user interface. In particular, a trading device enables a user to interact with the market data via a trading interface or application that is displayed on the screen. Many traders use smartphones, tablets and/or other portable devices as trading devices because the devices are easily operated and portable. For example, many traders use a trading device when working on a trading floor of an exchange. However, when using a trading device in close proximity to other people (e.g., other traders), privacy is a major concern. Traders strongly desire to keep their trading information private, especially from other traders who are located nearby (e.g., on the trading floor). For example, when viewing market data on a trading device, other traders in close proximity may be able to see the market data and other trading information displayed on the trading device. As a result, other traders may be able to ascertain the trading strategies and other private information of the trader. Competition within the trading markets is at an all-time high, as is the value of information relating to tradable objects. Thus, it is extremely important to prevent others from viewing market data and other private information on a trading device.

BRIEF DESCRIPTION OF THE FIGURES

Certain embodiments are disclosed with reference to the following drawings.

Figure 1:
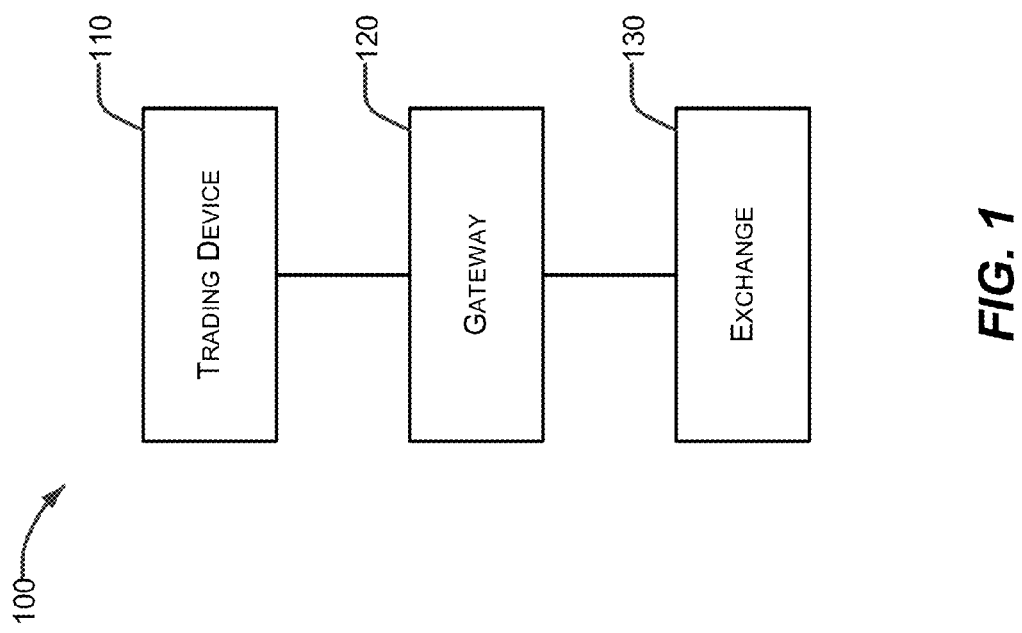
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

This disclosure relates generally to a trading device and, more particularly, to systems and methods to obfuscate market data on a trading device.

Traders typical use a trading device to interact with an exchange. In general, a trading device displays market data and/or other trading information to user and allows a trader to interact with the exchange (e.g., send an order to an exchange). In some examples, a trading device includes a trading interface or application that is displayed on a screen of the trading device. A trading device may be a desktop computer, hand-held device (e.g., a smartphone, a tablet, etc.), a laptop and/or a portable computing device, for example. When using a trading device in close proximity to other people (e.g., other traders), privacy is a major concern. For example, when viewing market data and/or other confidential trading information on a trading device in a public environment, other people (e.g., other traders) in close proximity may be able to see the market data and other trading information displayed on the trading device. As a result, the other traders may be able obtain valuable information about the trading strategies of the trader. This can be detrimental to the trader.

The example privacy systems and methods disclosed herein enable a user to obfuscate market data and other information displayed on a trading device to prevent other people (e.g., other traders) from being able to view the market data while still enabling the user to easily and accurately view and interact with the correct market data via a trading interface. An example privacy system disclosed herein includes a trading device that displays market data and other trading information via a trading interface. In a public setting, the trading device is switched to a private mode where at least a portion the market data values and other information are obfuscated. As used herein, obfuscated means alter, change, adjust, manipulate, suppress, hide, conceal or obscure from its original format. To view the obfuscated market data, the example privacy systems disclosed herein generate a private interface that displays or presents the market data and other information to a user (e.g., in an unobfuscated form). The private interface may be implemented by, for example, an optical head mounted display (OHMD) device having a screen or display on an inner surface of a lens that is located in front of the user's eye. While market data and other trading information may be obfuscated on the trading device screen, the correct market data is presented to the user view the OHMD. As a result, the privacy system prevents other people (e.g., other traders) from seeing the correct market data and other information on the trading device while still enabling the user to view the correct market data and interact with the trading interface (e.g., which results in an augmented reality for the user).

To enable the user to interact with the trading device as normal, the user needs to be able to recognize and understand how the market data displayed via the private interface is associated with obfuscated market data on the trading interface. For example, traders commonly view market data in a price ladder format, which presents market data for a tradable object in a grid with columns and rows. To place or execute an order, a trader selects one or more of the cells to execute an order for the tradable object in the corresponding cell. This trading interface format allows a trader to quickly place orders for a tradable object.

In some examples disclosed herein, the market data of the trading interface is obfuscated by removing or not displaying the market data values in the trading interface. For example, the trading interface includes the price ladder format (e.g., the grid of columns and rows) without the market data values in the associated cells. Instead, at least a portion of the obfuscated market data values are displayed to the user via the screen (e.g., the private interface) of the OHMD. To enable the user to associate or understand how the market data values displayed by the OHMD correlate to the trading interface, in some examples the screen of the OHMD is to be aligned with the trading interface so that the market data values are overlaid with the corresponding areas or cells of the trading interface. As a result, the trading interface appears as normal (e.g., with all of the correct market data values) to the user and the user can interact with the trading interface or application as normal. Therefore, the user can easily identify which areas on the trading interface correspond to which market data values, and the user can interact with the trading device to view additional market data, manipulate the market data, place orders, etc. However, because the market data is obfuscated on the trading device, other people around user cannot see the actual market data via the trading device.

In some examples, the screen of the OHMD and the trading interface do not need to be aligned to effectively convey the relationship between the market data on the screen and the corresponding areas of the trading interface. In some examples, a user interacts with the areas of the trading device by selecting (e.g., via touching, via a stylus, via keyboard) one or more areas (e.g., cells) on the trading interface. These areas may be highlighted (e.g., via a coloring, a shading and/or a border) in the trading interface. In response, the screen of the OHMD highlights the market data values that correspond to the selected areas. In some examples, the trading device communicates (e.g., via Bluetooth) the selection to the OHMD. Additionally or alternatively, the OHMD may detect the highlighted area on the trading interface (e.g., via an optical detection device or camera), determine the market data value(s) that correspond to the highlighted area and highlight the associated market data value(s) on the screen accordingly.

In some examples, inside market lines are displayed on the trading interface and similar lines are displayed on the screen of the OHMD in the same position relative to the market data values. As such, a user can recognize how the market data values correlate to the cells of the trading interface (e.g., by using the inside market lines as a reference). In some examples, the market data values are still displayed on the trading interface, but are obfuscated by adjusting the values by a factor. For example, the market data values may be displayed as 5000 less than the correct market data values. This adjustment factor may be predetermined by a user, for example. In some examples, the market data values are obfuscated on the trading interface by displaying the market data values as one or more symbols (e.g., a dynamic or static graphic, icon, character, letter, number, pictogram, color, gradient, altered textual string, Quick Response (QR) code or uniform resource locator (URL)).

In example systems and methods disclosed herein, the market data may be displayed on the trading device, normally, in a first mode (e.g., a normal mode) and the market data may be reconfigured (e.g., obfuscated) in a second mode (e.g., a private mode or public mode). In some examples, a user may switch between the modes manually. Additionally or alternatively, the trading device may detect when a threshold number of electronic devices are proximate (e.g., which indicates that people are nearby) and automatically switches the trading device and OHMD into the second mode. These examples (and more) enable the user to easily and efficiently interact with the trading device to view market data and/or interact with an exchange.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. Brief Description of Certain Embodiments

Certain embodiments disclosed herein provide a method including receiving market data related to a tradable object at a first computing device, generating, by the first computing device, a trading interface to present the market data to a trader and reconfiguring the trading interface from a first mode to a second mode in response to a privacy command supplied by the trader via the first computing device. In the example method, the first computing device is to obfuscate the market data presented by the trading interface when in the second mode. The example method includes receiving, by a second computing device, the obfuscated market data in response to the privacy command and generating, by the second computing device, a private interface to present the obfuscated market data to the trader in response to the privacy command.

Another embodiment disclosed herein provides a system that includes a first computing device including a first processor and a first memory. The first processor is configured to execute first instructions stored on the first memory to receive market data related to a tradable object, generate a trading interface to present the market data to a trader and reconfigure the trading interface from a first mode to a second mode in response to a privacy command supplied by the trader. The market data is to be obfuscated when the trading interface is in the second mode. The example system includes a second computing device including a second processor and a second memory. The second processor is configured to execute second instructions stored on the second memory to receive the obfuscated market data in response to the privacy command and generate a private interface to present the obfuscated market data to the trader in response to the privacy command.

An embodiment disclosed herein provides a tangible computer readable storage medium having first instructions that, when executed, cause a first computing device to at least receive market data related to a tradable object, generate a trading interface to present the market data to a trader and reconfigure the trading interface from a first mode to a second mode in response to a privacy command supplied by the trader. In the example, the market data is to be obfuscated when the trading interface is in the second mode. The tangible computer readable storage medium also has second instructions that, when executed, cause a second computing device to at least receive the obfuscated market data in response to the privacy command and generate a private interface to present the obfuscated market data to the trader in response to the privacy command.

In another embodiment disclosed herein, a method is provided that includes receiving market data related to a tradable object at a first computing device, generating, by the first computing device, a trading interface to present the market data to a trader and reconfiguring the trading interface from a first mode to a second mode in response to a privacy command supplied by the trader via the first computing device. In the example method, the first computing device is to obfuscate the market data presented by the trading interface when in the second mode. The example method includes providing the obfuscated market data to a second computing device in response to the privacy command. The second computing device of the example method is to generate a private interface to present the obfuscated market data to the trader in response to the privacy command.

Another embodiment disclosed herein provides a system including a first computing device including a processor and a first memory. The first processor is configured to execute instructions stored on the first memory to receive market data related to a tradable object, generate a trading interface to present the market data to a trader and reconfigure the trading interface from a first mode to a second mode in response to a privacy command supplied by the trader. In the example system, the market data is to be obfuscated when the trading interface is in the second mode. The first processor of the example system is also to provide the obfuscated market data to a second computing device in response to the privacy command. The second computing device is to generate a private interface to present the obfuscated market data to the trader in response to the privacy command.

Disclosed herein is an embodiment that provides a tangible computer readable storage medium having instructions that, when executed, cause a first computing device to at least receive market data related to a tradable object, generate a trading interface to present the market data to a trader and reconfigure the trading interface from a first mode to a second mode in response to a privacy command supplied by the trader. The market data is to be obfuscated when the trading interface is in the second mode. The instructions also cause the first computing device to provide the obfuscated market data to a second computing device in response to the privacy command. The second computing device is to generate a private interface to present the obfuscated market data to the trader in response to the privacy command.

Another embodiment disclosed herein provides a method that includes receiving, by a first computing device, market data related to a tradable object in response to a privacy command supplied by a trader via a second computing device. The second computing device reconfigures, in response to the privacy command, a trading interface from a first mode when the market data is presented to the trader to a second mode when the market data is obfuscated in the trading interface. The example method also includes generating, by the first computing device, a private interface to present the market data to the trader in response to the privacy command.

In another embodiment disclosed herein a system is provided that includes a first computing device including a processor and a memory. The processor is configured to execute instructions stored on the memory to receive market data related to a tradable object in response to a privacy command supplied by a trader via a second computing device. The second computing device reconfigures, in response to the privacy command, a trading interface from a first mode when the market data is presented to the trader to a second mode when the market data is obfuscated in the trading interface. The processor of the example system is also configured to generate a private interface to present the market data to the trader in response to the privacy command.

Another embodiment disclosed herein provides a tangible computer readable storage medium having instructions that, when executed, cause a first computing device to at least receive market data related to a tradable object in response to the privacy command supplied by a trader via a second computing device. The second computing device configures, in response to the privacy command, a trading interface from a first mode when the market data is presented to the trader to a second mode when the market data is obfuscated in the trading interface. The instructions cause the first computing device to generate a private interface to present the market data to the trader in response to the privacy command.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication with" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradable objects to the exchange 130.

Market data may include data about a market for a tradable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradable object is anything which may be traded. For example, a certain quantity of the tradable object may be bought or sold for a particular price. A tradable object may include, for example, financial products, stocks, options, bonds, future contracts, currency, warrants, funds derivatives, securities, commodities, swaps, interest rate products, index-based products, traded events, goods, or a combination thereof. A tradable object may include a product listed and/or administered by an exchange, a product defined by the user, a combination of real or synthetic products, or a combination thereof. There may be a synthetic tradable object that corresponds and/or is similar to a real tradable object.

An order message is a message that includes a trade order. A trade order may be, for example, a command to place an order to buy or sell a tradable object; a command to initiate managing orders according to a defined trading strategy; a command to change, modify, or cancel an order; an instruction to an electronic exchange relating to an order; or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. ("Trading Technologies"). As another example, the trading device 110 may be a server running a trading application providing automated trading tools such as ADL®, AUTO SPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, a group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a cellular network, a peer-to-peer network, a T1 line, a T3 line, an integrated services digital network ("ISDN") line, a point-of-presence, the Internet, a shared memory system and/or a proprietary network such as TTNET™ provided by Trading Technologies, for example.

The gateway 120 may include one or more electronic computing platforms. For example, the gateway 120 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a wireless network, a virtual private network, a cellular network, a peer-to-peer network, a T1 line, a T3 line, an ISDN line, a point-of-presence, the Internet, a shared memory system, and/or a proprietary network such as TTNET™ provided by Trading Technologies, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradable objects, for example, offered for trading by the exchange, to be bought and sold. The exchange 130 may include separate entities, some of which list and/or administer tradable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradable objects. Unmatched trade orders may be listed for trading by the exchange 130. Once an order to buy or sell a tradable object is received and confirmed by the exchange, the order is considered to be a working order until it is filled or cancelled. If only a portion of the quantity of the order is matched, then the partially filled order remains a working order. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
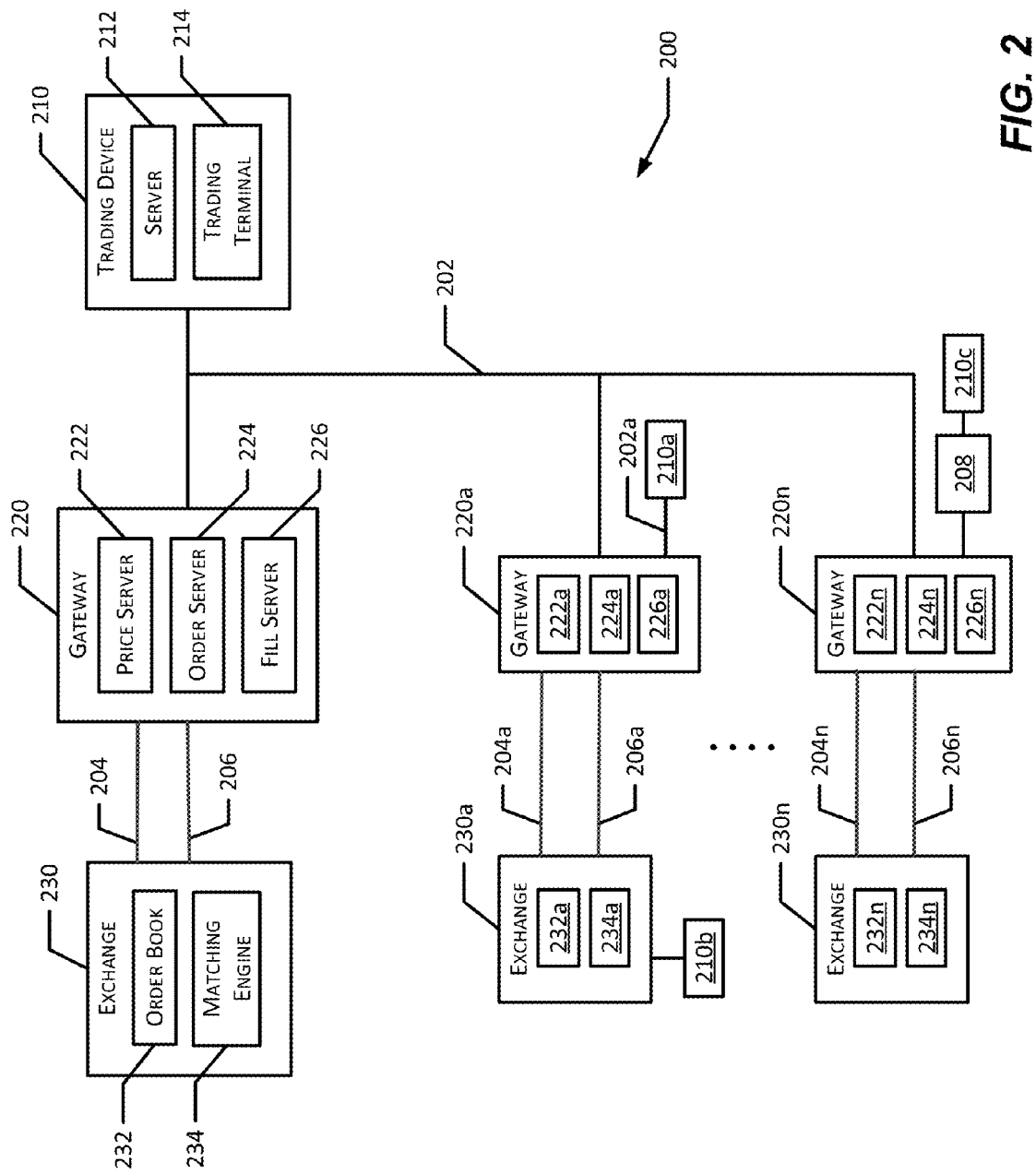
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210 may utilize one or more communication networks to communicate with a gateway 220 and exchange 230. For example, the trading device 210 utilizes network 202 to communicate with the gateway 220, and the gateway 220, in turn, utilizes the networks 204 and 206 to communicate with the exchange 230. As used herein, a network facilitates or enables communication between computing devices such as the trading device 210, the gateway 220, and the exchange 230.

The following discussion generally focuses on the trading device 210, gateway 220, and the exchange 230. However, the trading device 210 may also be connected to and communicate with "n" additional gateways (individually identified as gateways 220a-220n, which may be similar to gateway 220) and "n" additional exchanges (individually identified as exchanges 230a-230n, which may be similar to exchange 230) by way of the network 202 (or other similar networks). Additional networks (individually identified as networks 204a-204n and 206a-206n, which may be similar to networks 204 and 206, respectively) may be utilized for communications between the additional gateways and exchanges. The communication between the trading device 210 and each of the additional exchanges 230a-230n need not be the same as the communication between the trading device 210 and exchange 230. Generally, each exchange has its own preferred techniques and/or formats for communicating with a trading device, a gateway, the user, or another exchange. It should be understood that there is not necessarily a one-to-one mapping between gateways 220a-220n and exchanges 230a-230n. For example, a particular gateway may be in communication with more than one exchange. As another example, more than one gateway may be in communication with the same exchange. Such an arrangement may, for example, allow one or more trading devices 210 to trade at more than one exchange (and/or provide redundant connections to multiple exchanges).

Additional trading devices 210a-210n, which may be similar to trading device 210, may be connected to one or more of the gateways 220a-220n and exchanges 230a-230n. For example, the trading device 210a may communicate with the exchange 230a via the gateway 220a and the networks 202a, 204a and 206a. In another example, the trading device 210b may be in direct communication with exchange 230a. In another example, trading device 210c may be in communication with the gateway 220n via an intermediate device 208 such as a proxy, remote host, or WAN router.

The trading device 210, which may be similar to the trading device 110 in FIG. 1, includes a server 212 in communication with a trading terminal 214. The server 212 may be located geographically closer to the gateway 220 than the trading terminal 214 in order to reduce latency. In operation, the trading terminal 214 may provide a trading screen to a user and communicate commands to the server 212 for further processing. For example, a trading algorithm may be deployed to the server 212 for execution based on market data. The server 212 may execute the trading algorithm without further input from the user. In another example, the server 212 may include a trading application providing automated trading tools and communicate back to the trading terminal 214. The trading device 210 may include additional, different, or fewer components.

In operation, the network 202 may be a multicast network configured to allow the trading device 210 to communicate with the gateway 220. Data on the network 202 may be logically separated by subject such as, for example, by prices, orders, or fills. As a result, the server 212 and trading terminal 214 can subscribe to and receive data such as, for example, data relating to prices, orders, or fills, depending on their individual needs.

The gateway 220, which may be similar to the gateway 120 of FIG. 1, may include a price server 222, order server 224, and fill server 226. The gateway 220 may include additional, different, or fewer components. The price server 222 may process price data. Price data includes data related to a market for one or more tradable objects. The order server 224 processes order data. Order data is data related to a user's trade orders. For example, order data may include order messages, confirmation messages, or other types of messages. The fill server collects and provides fill data. Fill data includes data relating to one or more fills of trade orders. For example, the fill server 226 may provide a record of trade orders, which have been routed through the order server 224, that have and have not been filled. The servers 222, 224, and 226 may run on the same machine or separate machines. There may be more than one instance of the price server 222, the order server 224, and/or the fill server 226 for gateway 220. In certain embodiments, the additional gateways 220a-220n may each includes instances of the servers 222, 224, and 226 (individually identified as servers 222a-222n, 224a-224n, and 226a-226n).

The gateway 220 may communicate with the exchange 230 using one or more communication networks. For example, as shown in FIG. 2, there may be two communication networks connecting the gateway 220 and the exchange 230. The network 204 may be used to communicate market data to the price server 222. In some instances, the exchange 230 may include this data in a data feed that is published to subscribing devices. The network 206 may be used to communicate order data to the order server 224 and the fill server 226. The network 206 may also be used to communicate order data from the order server 224 to the exchange 230.

The exchange 230, which may be similar to the exchange 130 of FIG. 1, includes an order book 232 and a matching engine 234. The exchange 230 may include additional, different, or fewer components. The order book 232 is a database that includes data relating to unmatched trade orders that have been submitted to the exchange 230. For example, the order book 232 may include data relating to a market for a tradable object, such as the inside market, market depth at various price levels, the last traded price, and the last traded quantity. The matching engine 234 may match contra-side bids and offers pending in the order book 232. For example, the matching engine 234 may execute one or more matching algorithms that match contra-side bids and offers. A sell order is contra-side to a buy order. Similarly, a buy order is contra-side to a sell order. A matching algorithm may match contra-side bids and offers at the same price, for example. In certain embodiments, the additional exchanges 230a-230n may each include order books and matching engines (individually identified as the order book 232a-232n and the matching engine 234a-234n, which may be similar to the order book 232 and the matching engine 234, respectively). Different exchanges may use different data structures and algorithms for tracking data related to orders and matching orders.

In operation, the exchange 230 may provide price data from the order book 232 to the price server 222 and order data and/or fill data from the matching engine 234 to the order server 224 and/or the fill server 226. Servers 222, 224, 226 may process and communicate this data to the trading device 210. The trading device 210, for example, using a trading application, may process this data. For example, the data may be displayed to a user. In another example, the data may be utilized in a trading algorithm to determine whether a trade order should be submitted to the exchange 230. The trading device 210 may prepare and send an order message to the exchange 230.

In certain embodiments, the gateway 220 is part of the trading device 210. For example, the components of the gateway 220 may be part of the same computing platform as the trading device 210. As another example, the functionality of the gateway 220 may be performed by components of the trading device 210. In certain embodiments, the gateway 220 is not present. Such an arrangement may occur when the trading device 210 does not need to utilize the gateway 220 to communicate with the exchange 230, such as if the trading device 210 has been adapted to communicate directly with the exchange 230.

IV. Example Computing Device

Figure 3:
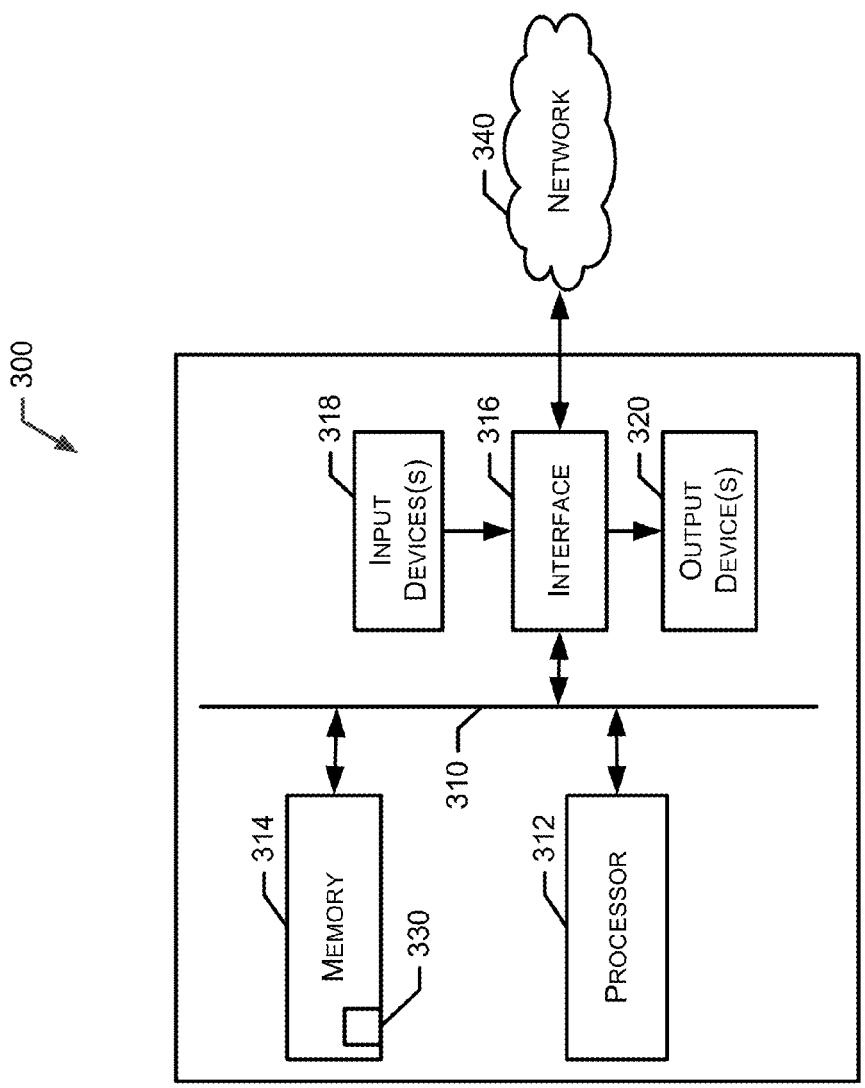
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. Trading Interface

Figure 4:
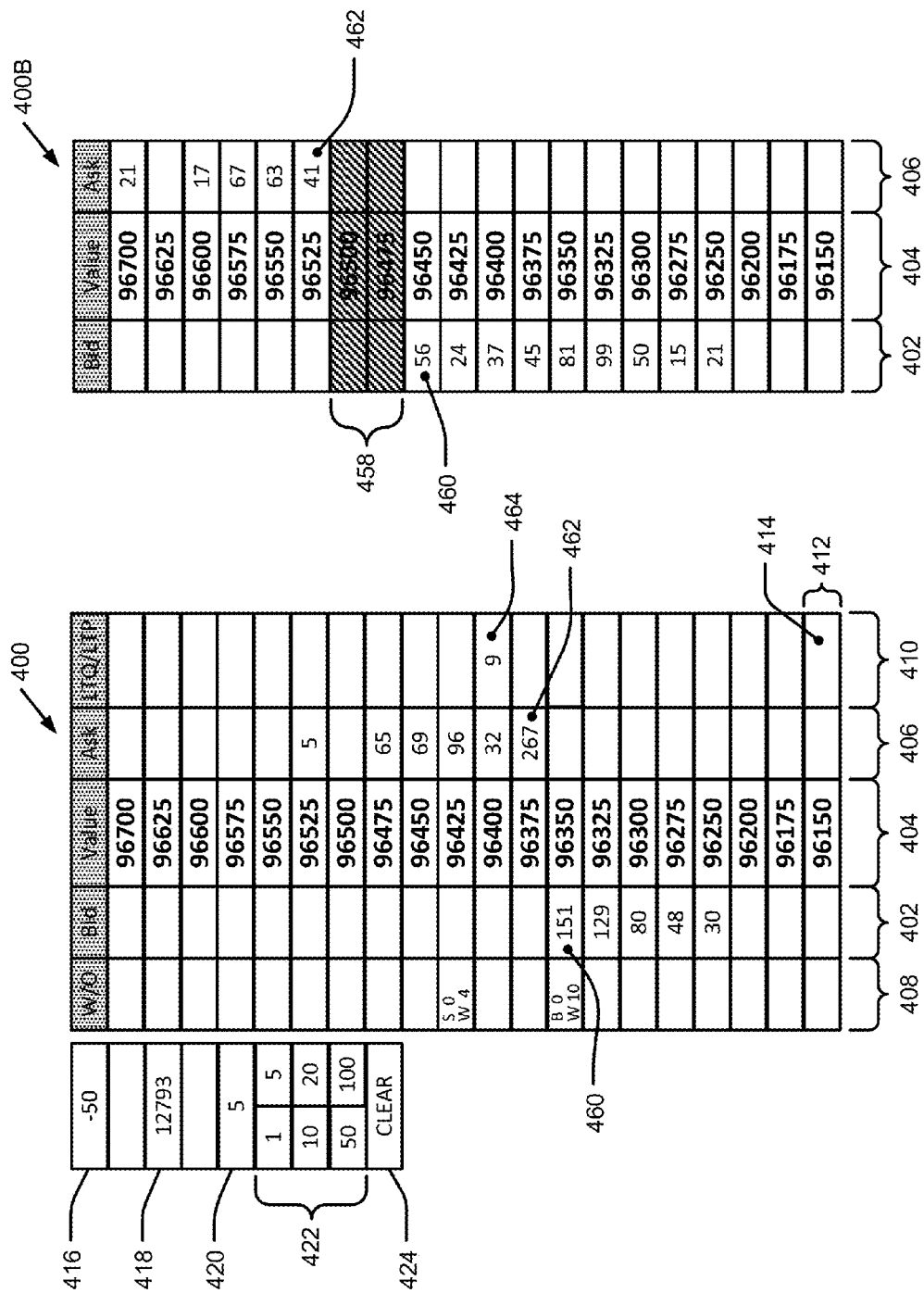
FIGS. 4A and 4B illustrate block diagrams representative of example trading interfaces in which certain embodiments may be employed.

FIG. 4A illustrates an example trading interface 400 in which certain embodiments may be employed. The example trading interface 400 shows market data for a tradable object at a first point in time. While the following examples are described in conjunction with the example electronic trading system 200 of FIG. 2, the examples disclosed herein may be implemented in other electronic trading systems, such as the example trading system 100 of FIG. 1.

As described above in conjunction with FIG. 2, the trading device 210 receives market data related to one or more tradable objects from the exchange 230 and/or the exchanges 230a-230n through the gateway 220 and/or the gateways 220a-220n, respectively. The trading device 210 provides a trading application including trading tools to process and/or organize the market data and provide the example trading interface 400. Trading tools include, for example, MD TRADER®, X_TRADER®, ADL®, AUTOSPREADER®, and AUTOTRADER™, each provided by Trading Technologies. The trading device 210 provides the trading interface 400 to enable a user to view market data and communicate trade orders and trade actions with an electronic exchange.

In the illustrated example of FIG. 4A, the trading interface 400 includes a bid column 402, a value column 404, and an ask column 406. The trading interface 400 further includes a working order (W/O) column 408 and a last traded quantity (LTQ)/last traded price (LTP) column 410. The trading interface 400 may include other columns such as an estimated position in queue (EPIQ) column, a single combined bid/ask column, a user-defined indicator column, an inside market indicator column, and/or any other column for providing indicators. The trading interface 400 also includes rows such as row 412. The columns intersect with the rows to define cells such as cell 414. In other embodiments, different orientations other than vertical columns may be used (e.g., horizontal and diagonal arrangements).

In the illustrated example, bid indicators representing the bid quantities of the tradable object are displayed in the bid column 402, value indicators corresponding to value levels are displayed in the value column 404, and ask indicators representing the ask quantities of the tradable object are displayed in the ask column 406. A bid quantity is a quantity available on the bid side of the tradable object at a given value level. The value levels can be configured to represent prices, net change, derivatives of price, consolidated prices, synthetic tradable object pricing, spread pricing, and/or other representations of value. The ask quantity is a quantity available on the ask side of the tradable object at a given value level. The indicators are not limited to numerical values and can include any type or combination of indicator or symbol to illustrate the presence of available quantity without providing a specific numeric value. For example, the indicators may include text, icons, colors, lines, and/or other graphical representations. In one example, the indicators may represent a range of quantity available at particular value levels in place of specific, and frequently changing, quantity values. In another example, the relative size of indicators may proportionally represent the quantity available. In another example, the indicators may represent simply that there is quantity available with no illustration of the amount in excess of zero.

Trading interfaces, such as the trading interface 400, may include indicators to identify the inside market. The inside market indicators may utilize multiple representations to identify the highest bid price and the lowest ask price. The inside markets indicators may also include additional information such as information related to quantities at the inside market. Examples of inside market indicators include a best bid price indicator representing the highest available bid price, a best ask price indicator representing the lowest available ask price, and/or an indicator representing a range between the highest available bid price and the lowest available ask price. As shown in FIG. 4B, the inside market indicator may highlight and identify the range 458 of value levels between the highest available bid price of "96450" and the lowest available ask price of "96525". Inside market indicators may be displayed within the trading interface to identify specific value level(s) in the value column 404. For example, a best bid price indicator may be displayed in a cell containing a bid quantity indicator and corresponding to a value level that reflects the best bid price. As another example, a best ask price indicator may be a color or symbol combined with an ask quantity indicator in the ask column 406 in a cell corresponding to a value level that reflects the best ask price. As another example, inside market indicators may be displayed at value levels within the value column 404 that reflect the best bid price and the best ask price. The inside market indicators can include any type or combination of indicator or symbol (e.g., the indicators may include text, icons, colors, lines, and/or other graphical representations).

In certain embodiments, the inside market indicators may be provided by the presence of a quantity indicator. The presence of a quantity indicator refers to the existence and location of the quantity indicator. For example, the presence of the best bid quantity indicator, independent of the quantity value displayed at any given point in time, in the bid column may be the best bid price indicator. Thus, the existence of a quantity indicator at the highest value level in the bid column is the best bid price indicator. To be clear, in this example, the value of the bid quantity indicator is not part of the best bid price indicator. Rather, the existence of the bid quantity indicator itself at the highest value level in the bid column is the best bid price indicator. In other words, the display of the highest bid quantity indicator is the best bid price indicator. As shown in FIG. 4A, the presence of the bid quantity indicator "151" at the highest value level in the bid column at the price of "96350" is the best bid price indicator 460. Similarly, the presence of the ask quantity indicator "267" at the lowest value level in the ask column at the price of "96375" is the best ask price indicator 462.

From the user's perspective, the trading interface 400 may present and display indicators, such as inside market and LTP/LTQ indicators, in a manner that conveys the appearance of movement relative to the value column 404. For example, the manner in which the trading interface alters the position of the best bid price indicator and the best ask price indicator relative to the value levels within the value column may allow the user to perceive changes in both the speed and direction of trading within a market. The trading interface 400 updates based on received market data. For example, the trading interface 400 moves the best bid price indicator 460 relative to the value column 404 when the received market data includes a quantity at a new highest bid price. As another example, the trading interface 400 moves a LTP indicator 464 (shown in the LTQ column 410 of FIG. 4A) relative to the value column 404 when the received market data includes a new last traded price.

The trading interface 400 shown in FIG. 4A depicts and identifies the inside market via the best bid price indicator 460 aligned with the highest available bid price and the best ask price indicator 462 aligned with the lowest available ask price at a first point in time. For example, the best bid price indicator 460 is moved to reflect the change in the best bid price from "96350" (FIG. 4A) to "96450" (FIG. 4B). Similarly, the best ask price indicator 462 is moved to reflect the change in the best ask price from "96375" to "96525". By observing the movement of the inside market indicators relative to the value column 404 in the described manner, the user can quickly perceive that the market is trading higher.

Moreover, as illustrated in the trading interface 400 shown in FIG. 4A, the bid quantity indicator "151" is at the best bid price "96350" and the ask quantity indicator "267" is at the best ask price "96375". At the second point in time, the displayed quantity indicators are updated to reflect new quantities available. As shown in FIG. 4B, the bid quantity indicator "56" is at the best bid price "96450" and the ask quantity indicator "41" is at the best ask price "96525". Although the quantity values have changed, it is the presence of the bid quantity indicator at the highest value level in the bid column and the presence of the ask quantity indicator at the lowest value level that are the inside market indicators.

From the user's perspective, indicators may appear to move relative to the value column 404. This appearance of movement may result from painting an indicator in a new location on the trading interface 400 or painting over to remove an indicator from the trading interface 400. Painting may include drawing on a surface, multilayer compositing, or other rendering techniques. For example, in the bid column 402, painting a new quantity indicator above the current best bid quantity indicator creates the appearance of upward movement to inform the user that the market has moved. In another example, in the ask column 406, painting over the best ask quantity indicator to remove it from the trading interface 400 results in the appearance of upward movement in the market. As another example, other indicators such as the LTP indicator 464 can appear to move relative to the value column 404 using these techniques.

The movement of the indicators relative to the value column 404 may be implemented in a variety of ways. In certain embodiments, movement of an indicator includes repositioning the indicator from one location to another location. For example, the best bid price indicator may be a graphical user interface element or object, such as a line, shape, arrow, or sprite, the on-screen position of which is changed to a new location representing a new best bid price. In certain embodiments, movement of an indicator includes removing the indicator at one location and replacing it with a new indicator at another location, which as user may perceive as the appearance of movement. For example, the best bid price indicator may be a yellow background color for a cell in the value column 404. When the best bid price changes, the background color for the cell is changed to default color (e.g., black) and the background color of a second cell associated with the new best bid price is changed to yellow to provide the new best bid price indicator. In certain embodiments, the object representing the best bid price indicator may change from one location to another location. For example, the value, color and/or shape of the best bid price indicator may change from one location to another location.

When quantity information is displayed in relation to the value column 404 and the market moves up or down, the inside market indicators can be said to "move" up or down from the user's perspective in relation to the value column 404 to reflect a new highest bid price or a new lowest ask price. For example, when the quantity indicators are represented with numerical values and the inside market indicators are provided by the presence of the highest bid quantity indicator and lowest ask quantity indicator, the exact numeric value representing the quantity at the best bid price or the best ask price need not move or provide the appearance of movement. The quantity indicators, in this particular example, at those particular price levels may have changed, but they do not actually move—it is the best bid indicator that has "moved."

The value indicators in the value column 404 may be repositioned. A selected value indicator may be repositioned to a designated location and other value indicators are repositioned relative to the selected value indicator. The selected value indicator may be based on, for example, a user selection or market related values such as the highest bid price or lowest ask price, LTP, and a calculated average of the best bid and best ask prices. The designated location may be a pre-determined location or a location defined by a user. In one configuration, in response to the repositioning command, the selected value indicator may be moved to the designated location corresponding to the middle of the display (e.g., to a location corresponding substantially to the midpoint of the length of the value column 404). In another configuration, in response to the repositioning command, the selected value indicator can be displayed at a user-identified or pre-defined position within the display. From a user's perspective, repositioning is the appearance of movement of values in the value column 404 to new locations in the value column 404. This appearance of movement may result from repainting the values in the value column 404.

The value indicators in the value column 404 may be repositioned in response to various commands or triggering conditions. In one example, the value indicators displayed in the value column 404 may be repositioned in response to a triggering condition. Some examples of a triggering condition include: a user input; expiration of an alarm or timer; a determination that the inside market is, or may be, moving off the display; a determination that the inside market has exceeded an upper threshold or a lower threshold; an event in another trading interface; a market event relating to the same or a different tradable object; a user-defined event; and/or a determination that a value exceeds a threshold.

In some examples, an indicator based on market data (such as best bid, best ask, LTP) may be displayed at the same fixed location in the trading interface 400. For example, the best bid indicator in the bid column 402 may be displayed at a specified fixed location. The fixed location may be pre-determined or defined by a user. For example, the best bid indicator and/or the best ask indicator may, for example, be maintained at the center of the display, at the top of the display, at the bottom of the display or any designated location.

In the illustrated example, the values, which are prices, are displayed without decimal points (which may be a format or convention expected by a user) and in descending order from a top to a bottom of the value column 404 in the orientation of FIG. 4A. In other examples, the prices are listed in other orders (e.g., ascending order from top to bottom) and/or formats (e.g., with decimal points, fractions, in scientific notation, and/or any other format).

In the illustrated example, the indicators in the bid column 402 and the ask column 406 are updated to indicate quantity changes at each value level identified along the value column 404. For example, values of the ask quantities and/or the bid quantities may increase or decrease due to order quantities being added, deleted or matched at each value level. The indicators may be updated based on a timer and/or in response to new data being received, for example.

In some examples, the trading interface 400 includes additional and/or different information. In the illustrated example, the trading interface 400 also displays a net price change 416 of the tradable object over a given amount of time (e.g., since the market opened on a given day). The trading interface 400 also includes a total volume 418 of the tradable object (e.g., a number of lots that have been traded). Other embodiments may include different and/or additional information.

The trading interface 400 also enables the user to specify parameters for a trade order. In the illustrated example, the trading interface 400 includes a quantity field 420. The quantity field 420 displays a quantity (e.g., 5) for an order that the user will send to market, and the user may adjust the quantity by selecting (e.g., via a mouse) one of a plurality of buttons 422 adjacent the quantity field 420 or entering a new value into the quantity field 420. If the user selects a button 424 labeled "CLEAR" in the illustrated example, the quantity field 420 is cleared (e.g., the quantity displayed in the quantity field 420 is adjusted to be zero).

The trading interface 400 further enables the user to enter an order to buy or sell a tradable object via an order entry area configured to receive a selection and in response initiate placement of the order. Selection of an order area may be by a single action of an input device such as a single click, a double click, or a multi-touch gesture. Initiating placement of an order may include preparing a message to send an order to an exchange or sending an order to an electronic exchange. The trading interface 400 may include multiple order entry areas. The trading interface 400 may request that a user confirm an order to be placed prior to sending it.

Order entry areas may overlap or encompass one or more regions of a trading interface. For example, an order entry area may overlap all or part of the cells making up a row. As another example, an order entry area may overlap all or part of the cells in a column such as the bid column, ask column or value column. In another example, an order entry area may overlap a cell and a region outside of the cell. In certain embodiments, a trading interface may include a first order entry area overlapping first cell and a second order entry area overlapping a second cell. In certain embodiments, a first order entry area overlaps a first cell and a portion of a second cell, and a second order entry area overlaps a portion of the second cell and a third cell. In certain embodiments, order entry areas may encompass other regions of the trading interface.

Each order entry area may align with a value level. For example, an order entry area may be aligned with one of the value levels making up the value column 404. In another example, an order entry area may be independent of and not aligned with a value level.

An order entry area may be linked to other elements of the trading interface 400. For example, an order entry area may be linked to a particular value level making up a value column by specifying a value level followed by specifying an order entry area. Subsequently, selection of the linked order entry initiates placement of the order based on the linked value. As another example, selection of a cell associated with a particular value level may link a pre-defined order entry area to the particular value level.

Upon selection of an order entry area to initiate placement of an order, one or more parameters of the order may be determined based on the selected order entry area. Order parameters may include order price, order quantity, order side, and/or order type. Other order parameters may be specified. Values for the parameters may be default values, preconfigured values, previously determined values, values set based on the location of the selection within the order entry area, values set based on the location of the order entry area, values set based on the method of the selection (e.g., a left click, a right click, a keyboard entry and a double click).

The manner in which the selection of an order entry area is made may affect the type of order or the way in which placement of an order is initiated. For example, selection within a row configured as an order entry area may include correlating the position of the selection to a specific cell or column arranged and aligned relative to the order entry area. The type of single action provided via the input device may further specify the selection. For example, if the user initiates a single action corresponding to a right click within an order entry area aligned with a portion of the row corresponding to a cell in the value column, then the selection may initiate placement of a buy order. Similarly, if the user initiates a single action corresponding to a left click over a portion of the row corresponding to a cell in the value column, then the selection may initiate placement of a sell order. As another example, selecting an order entry area encompassing the cells in the bid column may initiate placement of a buy market order when the selection is a single point touch applied to a touch sensitive interface and a buy sweep order when the selection is a two point touch to the touch sensitive interface.

VI. Trading Device Privacy Systems and Related Methods

Figure 5:
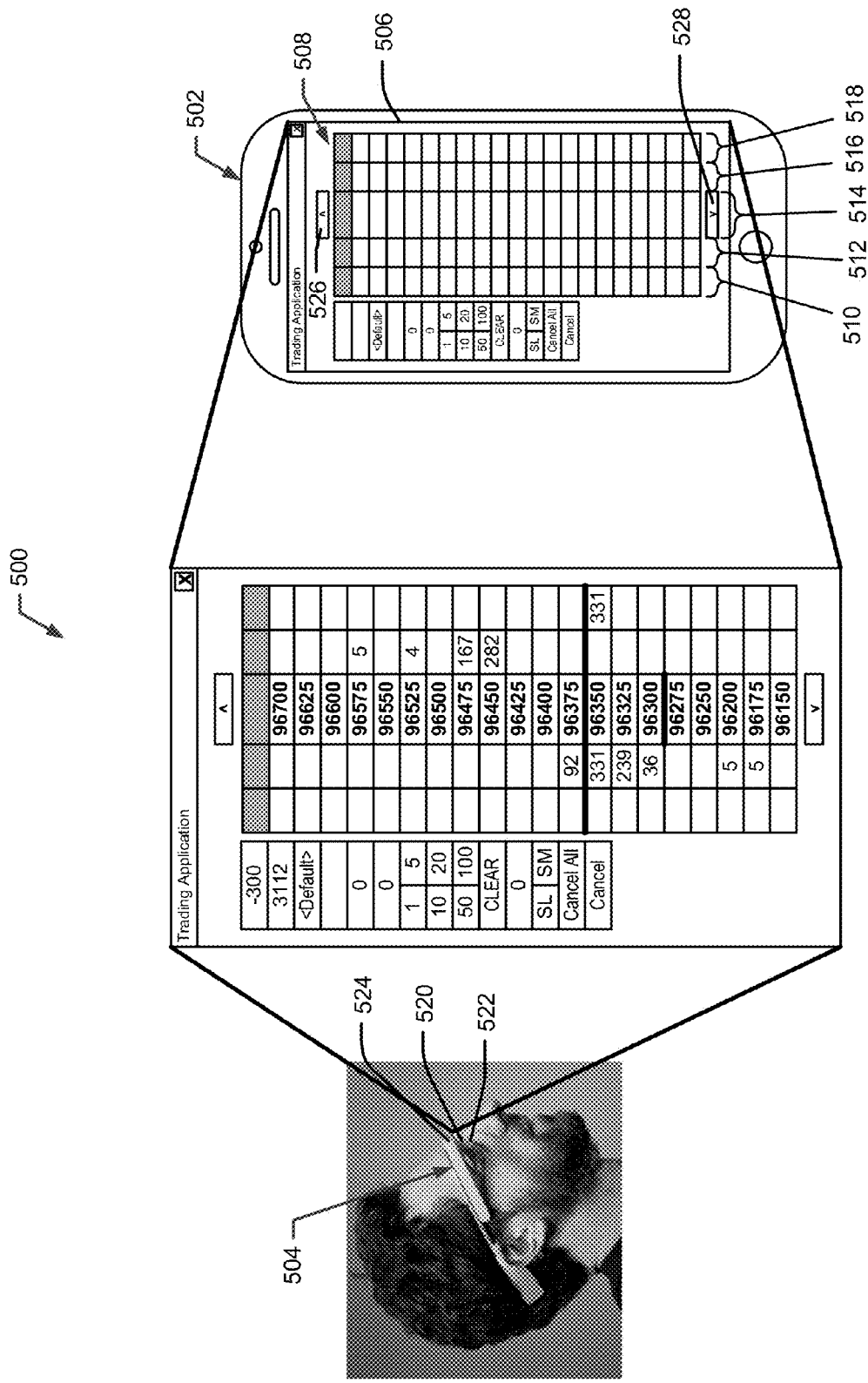
FIG. 5 illustrates an example privacy system including an example trading device and an example private interface to obfuscate market data in accordance with the teachings of this disclosure.

FIG. 5 illustrates an example privacy system 500 configured to present obfuscated data to a user (e.g., a trader) in a privacy setting (e.g., mode) in accordance with the teachings of this disclosure. The example privacy system 500 includes a trading device 502 to display market data and wearable display such as an optical head mounted display (OHMD) 504 to view at least a portion of the market data. The trading device 502 may be similar to, for example, the trading device 210 and receive market data related to one or more tradable objects from the exchange 230 and/or the exchanges 230a-230n through the gateway 220 and/or the gateways 220a-220n, respectively.

The trading device 502 includes a user interface or screen 506 to display information. In the illustrated example, the trading device 502 is displaying a trading interface 508 having a plurality of cells (e.g., in the form of rows and columns) for presenting information. The trading interface 508 may similar to, for example, the trading interface 400 and may be implemented as a trading application that includes trading tools to process and/or organize the market data. Trading tools include, for example, MD TRADER®, X_TRADER®, ADL®, AUTOSPREADER®, and AUTO-TRADER™, each provided by Trading Technologies. The trading device 502 provides the trading interface 508 to enable a user to view market data and communicate trade orders and trade actions with an electronic exchange.

In the illustrated example, the trading interface 508 includes a bid column 510, a value column 512, an ask column 514, a working order (W/O) column 516 and a last traded quantity (LTQ)/last traded price (LTP) column 518. As mentioned above, the trading interface 508 may be similar to, for example, the trading interface 400 of FIG. 4A. However, in the illustrated example, at least a portion of the market data in the trading interface 508 is obfuscated or otherwise hidden from causal observation. Specifically, in this example, the values of the market data from columns 510-518 are removed or not displayed in their corresponding cells of the trading interface 508. By obfuscating the market data on the trading interface 508, anyone viewing the trading interface 508 is unable to ascertain any valuable information from the trading device 502.

To present the market data to a user, privately, the example OHMD 504 includes a lens 520 with a screen 522 (e.g., which generates a private interface) on an inner surface of the lens 520. The screen 522 displays at least a portion of the market data in an unobfuscated format for the user to see. In other words, the OHMD 504 displays the market data values that have been obfuscated (e.g., removed) from the trading interface 508. In some examples, the market data values are presented on the screen 522 without the corresponding cells (e.g., the lines that form the cells) that are displayed via the trading interface 508. To view the market data values in the corresponding cells of the trading interface 508, the screen 522 is to display the market data values over or in front of the trading interface 508 when the screen is aligned with the trading device 508. Thus, the user may view the market data values appear as if they are in the corresponding cells as normal. FIG. 5 illustrates an enlarged view of the market data being displayed on the screen 522 in an overlapping or overlaid format with the trading interface 508.

To align the market data values on the screen 522, the OHMD 504 of the illustrated example includes a camera 524. Using the camera 524, the OHMD 504 tracks the position, location and/or orientation (e.g., angle) of the trading device 502 (e.g., via an algorithm). In other words, the camera 524 detects where the trading interface 508 is and how it is oriented relative to the screen 522 (e.g., how the screen 522 is aligned with the trading interface 508). The market data is then displayed on the screen 522, which, in turn, overlaps with the trading interface 508 (from the viewpoint of the user), to present the market data in a viewable and understandable form (e.g., similar the enlarged view of FIG. 5). The OHMD 504 adjusts the size, spacing and/or location of the market data values on the screen 522 to align with the trading interface 508. Thus, when viewing the trading device 502 through the screen 522, the trading interface 508 appears as normal such as, for example, similar to the trading interface 400 of FIG. 4A. As such, other people around the user (e.g., proximate the user) cannot see what information the user is viewing on the trading device 502, because the market data obfuscated (e.g., removed and hidden from observation). In this example, the market data is completely removed from the trading interface 508 on the trading device 502. Therefore, only the user wearing the OHMD 504 receives the market data from the viewpoint of the user.

In the illustrated example, the trading interface 508 includes an up scroll button 526 and a down scroll button 528 that enable a user to scroll up or down through the columns 510-518 of market data. When scrolling up and down through the market data on the trading interface 508, the market data values and their position on the screen 522 of the OHMD 504 change accordingly to align the market data values with their corresponding cells on the trading interface 508. Therefore, the user may view all of the market data values as normal.

In the illustrated example, the trading device 502 is a phone. However, the trading device 502 may be implemented one or more of a desktop computer, hand-held device (e.g., a tablet), laptop, server, a portable computing device, a trading terminal, an embedded trading system, a workstation, an algorithmic trading system such as a "black box" or "grey box" system, cluster of computers, or a combination thereof.

Although the trading interface 508 is illustrated as the MD TRADER®, by Trading Technologies, the trading device 502 may display any type of interface (e.g., an internet application, a game, a Microsoft WORD® document, etc.) that presents information to a user that the user deems private or confidential.

In the illustrated example, the OHMD 504 is implemented as a wearable headset. The OHMD 504 may be implemented as, for example, Google Glass, Media glasses, virtual reality glasses and/or any other wearable computing device capable of displaying information to a user in a private interface. Other example implementations of the OHMD 504 include an Integrated Helmet And Display Sight System (IHADSS), and a Scorpion Helmet Mounted Cueing System (HMCS).

Figure 6:
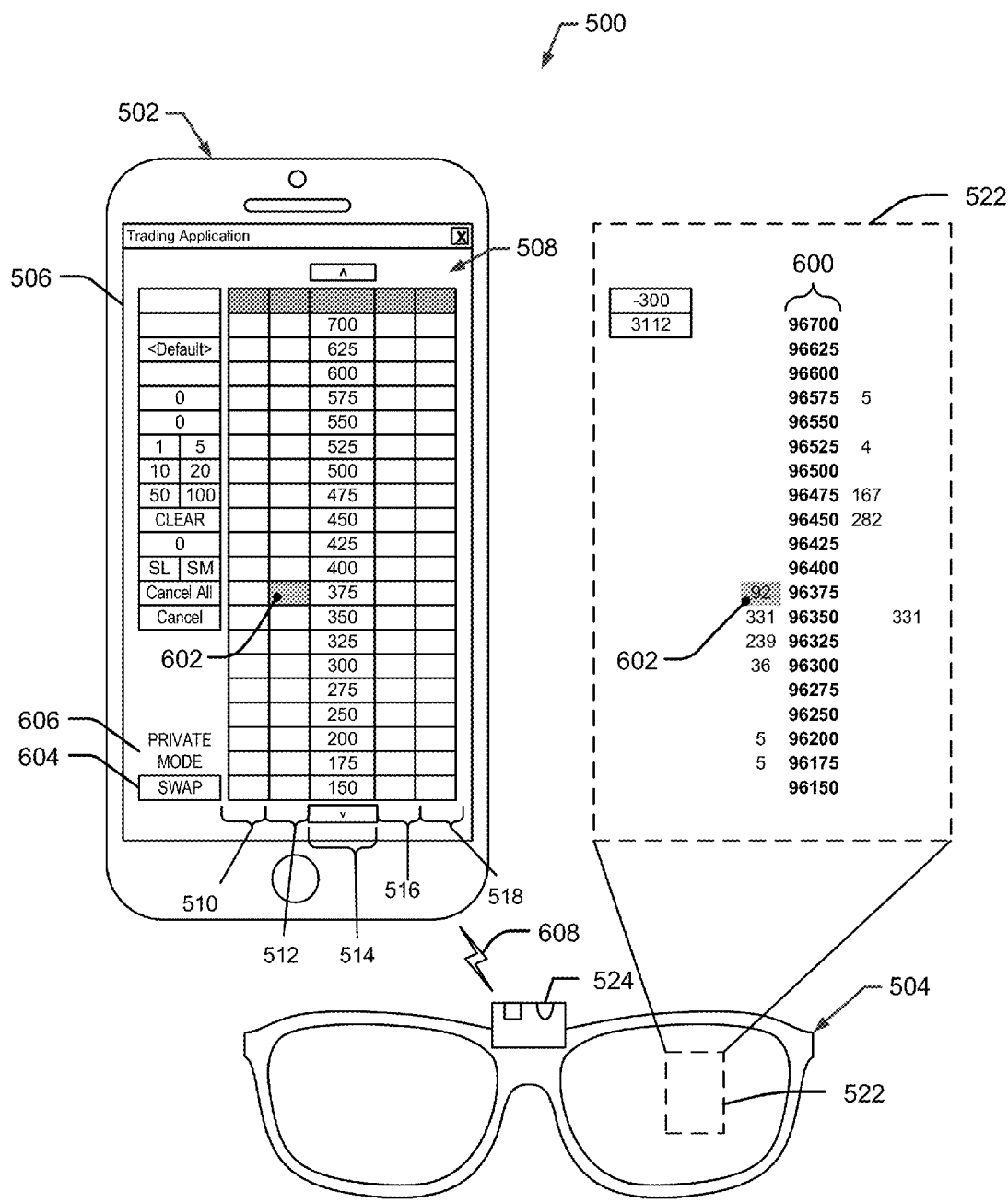
FIG. 6 illustrates the example privacy system of FIG. 5 presenting obfuscated market data in alternative example.

In the illustrated example of FIG. 6, the trading device 502 is in communication with the OHMD 504, which enables the trading device 502 to transmit (e.g., send, transfer) market data or other information to and/or receive signals from the OHMD 504. As disclosed herein, the trading device 502 may receive market data from one or more gateways and/or exchanges (e.g., the gateway 120 and/or the exchange 130). In turn, the trading device 502 transmits the market data to the OHMD 504 to be displayed on the screen 522. Because the trading device 502 and the OHMD 504 are in communication, the OHMD 504 is capable of displaying the market data on the screen 522 of the OHMD 504 without being aligned with trading interface 508 on the trading device 502. For example, some OHMDs include a screen that is aligned in front of the user's eye. As such, a user may be able to align the market data on the screen 522 with the trading interface 508 (e.g., similar to FIG. 5) to view the market data and understand it's relation to the different areas on the trading interface 508. However, other example OHMDs (e.g., Google Glass) include a screen that is located near a side of the user's head and is the user's periphery. Therefore, the privacy system 500 enables a user to view the market data on the periphery without having to align the market data and the trading interface 508.

In some examples, to enable the user to associate the market data displayed on the screen 522 with the corresponding cells in the trading interface 508 without having to align the screen 522 with the trading interface 508, the trading interface 508 displays values within the value column 514 and the screen 522 displays a column 600 of associated values (e.g., a price ladder, a price tree) to the user. By providing values within these two areas, a user can associate the market data displayed on the screen 522 with certain cells in the trading interface 508 (e.g., by viewing the relative spacing or number of cells from a reference cell).

However, to enable the user to keep the correct values in the value column 514 private, the values in the value column 514 on the trading interface 508 are obfuscated. Specifically, in this example, the values in the value column 514 are altered or adjusted. For example, the trading device 502 displays the values without the first two numbers or digits. On the other hand, the values in the column 600 on the screen 522 are displayed correctly. As such, a user wearing the OHMD 504 may be able to tell where the information on the screen 522 is without having to align the screen 522 with the trading interface 508 (e.g., by matching the last three digits).

In some examples, the trading device 502 transmits instructions to display the correct values in the value column 514. In other examples, the camera 524 on the OHMD may detect the presence of the values in the value column 514 and may adjust the values to display correctly in the column 600 on the screen 522 (e.g., via instructions from the trading device 502 to adjust the values). The obfuscated values in the trading interface 508 may be altered or adjusted by removing certain digits (e.g., the first digit), multiplying the values by a multiplier (e.g., ×2) and/or changing the numbers in accordance with other suitable adjustment factor.

In some examples, the manner in which the values on the trading interface 508 are adjusted or altered is set (e.g., predetermined) by the user. For example, the user may select to have the first two numbers of the values in the value column 514 removed. Therefore, when the user is viewing the values in the value column 514 on the trading device 502, the user can recognize that only the last few digits are present. As such, the user can easily identify how the market data on the screen 522 corresponds with the cells on the trading device 502. In other examples, the user may select to have the values in the value column 514 multiplied by a certain factor.

In some examples, one or more cells in the trading interface 508 may be highlighted and the corresponding market data on the screen 522 is also highlighted. For example, in the illustrated example of FIG. 6, the user selected (e.g., by touching or hovering over the screen 506 with his/her finger, via a stylus, via a keyboard on the trading device 502) the screen 506 to highlight cell 602 on the trading interface 508. In response, the trading device 502 communicates the request to the OHMD 504 to highlight the corresponding value of the cell 602 on the screen 522. Therefore, the user can recognize which value(s) on the screen 522 correspond to which cells on the trading interface 508 of the trading device 502. The trading interface 508 and/or the screen 522 may highlight the corresponding areas using a different color and/or shading. Additionally or alternatively, the OHMD 504 may detect when one or more of the cells are highlighted on the trading interface 508 via the camera 524. In response, the OHMD 504 highlights the corresponding data values on the screen 522 for the user to identify the data values that correspond to the highlighted cell. Thus, in some examples, the highlighted or selected market data information is not sent from trading device 502, but is instead identified by the OHMD 504.

In the illustrated example, only a portion of the values from the trading interface 508 are obfuscated. For example, the values in the columns 510, 512, 516, 518 are not displayed or removed, and the values in the value column 514 are obfuscated using the adjustment technique. However, other values from column 514 on the trading interface 508 are still displayed on the trading device 502. In other examples, all of the values or information from the trading interface 508 is obfuscated. In other examples, other portions of the value or information from the trading interface 508 are obfuscated.

In some examples, the privacy system 500 enables a user to switch back-and-forth between a private mode or setting, in which at least a portion of the market data is obfuscated, and a normal mode or setting, in which the market data is presented as normal via the trading interface 508. In some examples, these modes or settings are manually implemented via a switch or button on the trading device 502 and/or the OHMD 504. For example, the screen 506 of the trading device 502 displays a button 604 (SWAP) to switch back-and-forth between the privacy mode and the normal mode. In the illustrated example, the trading device is in the privacy mode, and an indicator 606 is displayed on the screen 506 (e.g., or in the trading interface 508) as "PRIVATE MODE," which indicates to the user in what mode the trading device 502 is operating. If a user selects the button 604, the trading device 502 switches to the normal mode to display all of the market data on the trading interface 508, normally (e.g., unobfuscated). In response, the indicator 606 may display "NORMAL MODE" to indicate to the user in what mode the trading device 502 is operating. In some examples, the OHMD 504 may use facial character recognition software to detect (e.g., via the camera 524) when other people are close to the trading device 502.

Additionally or alternatively, the privacy system 500 may switch into the privacy mode automatically such as, for example, when other people are detected near the trading device 502. For example, the trading device 502 and/or the OHMD 504 may transmit a signal (e.g., a ping) and monitor for a response from other electronic devices in the proximity. In some examples, the trading device 502 and/or the OHMD 504 may monitor for other signals (e.g., cell phone signals, wireless data signals, etc.) transmitted from nearby devices. If other electronic devices are detected, the privacy system 500 switches into the privacy mode to prevent other people from viewing the market data on the trading device 502. In some examples, this is overridden by a manual command from the user (e.g., by selecting the button 604).

Instead of communicating the market data from the trading device 502 to the OHMD 504 (e.g., directly) as indicated by the communication connection 608, in some examples the trading device 502 and/or the OHMD 504 are in communication with a network such as, for example, the Internet, an intranet, a virtual private network (VPN), a personal area network (PAN) a trading platform, a server (e.g., an exchange server, an order server, a gateway, etc.), etc. In the illustrated example of FIG. 7, the privacy system 500 is in communication with a network 700 that provides the market data to the trading device 502 and/or the OHMD 504 and also enables communication between the trading device 502 and the OHMD 504. The network 700 provides real-time market data to the trading device 502 and/or the OHMD 504.

To enable the OHMD 504 to detect the source of the market data that is to be presented via the trading interface 508, the privacy system 500 includes a network indicator 702 on the screen 506 or trading interface 508 to indicate the source of the market data. The camera 524 detects (e.g., scans) the network indicator 702 so that the OHMD 504 can link with the network 700 to receive the same market data as the trading device 502. In the illustrated example, the network indicator 702 is implemented as a Quick Response (QR) code. The camera 524 of the OHMD 504 detects the QR code 702, identifies the network 700 associated with the QR code 702 (e.g., via an integrated algorithm or processing component) and retrieves the market data to be displayed on the screen 522. In other examples, other types of network indicator(s) may be utilized such as, for example, a uniform resource locator (URL), a bar code and/or any other resource graphic that is capable of being detected and interpreted by the OHMD 504.

Figure 7:
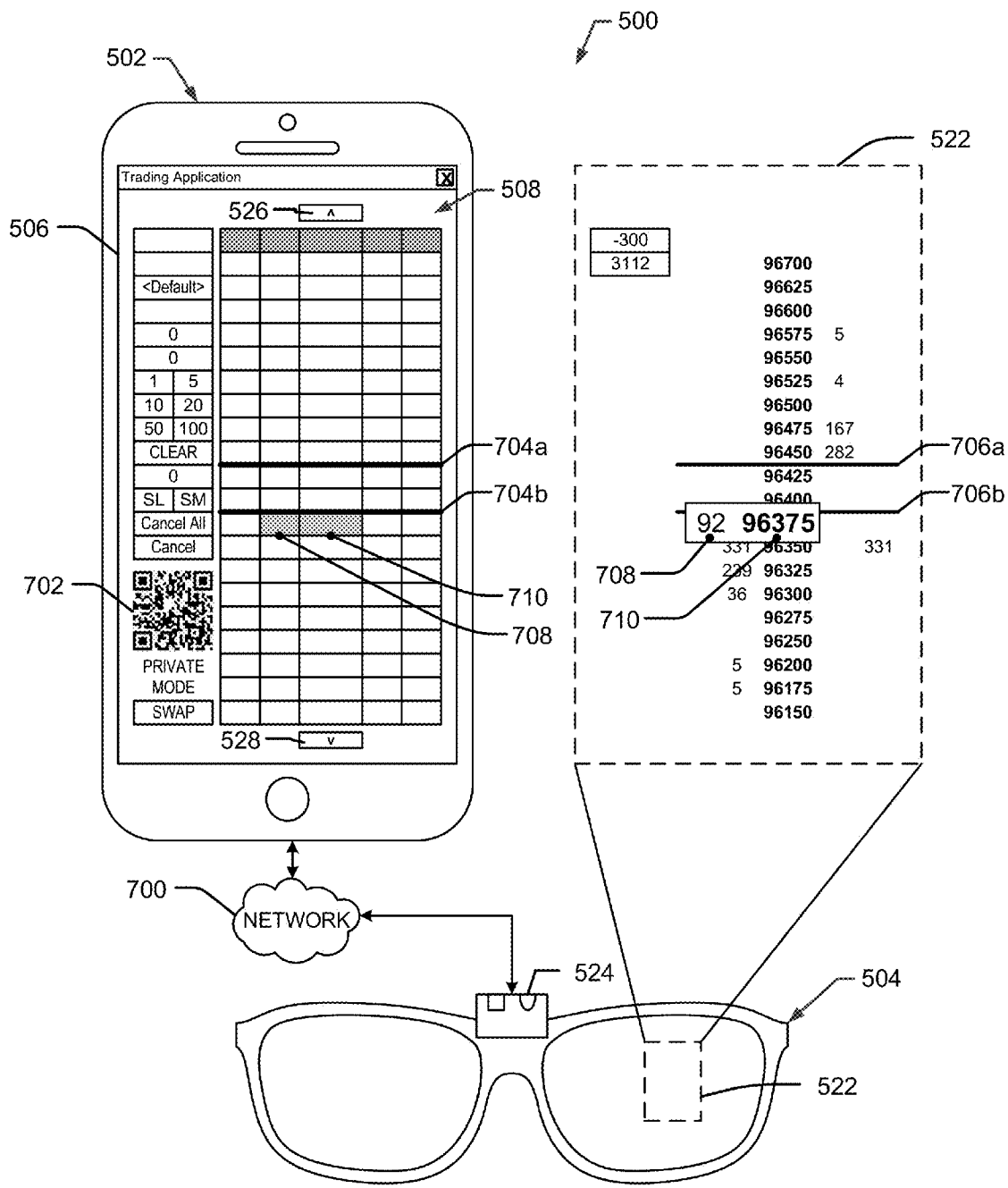
FIG. 7 illustrates the example privacy system of FIG. 5 presenting obfuscated market data in another alternative example.

In the illustrated example of FIG. 7, the market data values are obfuscated on the trading interface 508 by removing or not displaying the market data values. The market data is displayed on the screen 522 of the OHMD 504 for the user to view. To enable the user to match or associate the market data on the screen 522 with the corresponding cells of the trading interface 508, the trading interface 508 provides inside market lines 704a, 704b, and the OHMD 504 provides lines 706a, 706b corresponding to the location of the inside market lines 704a, 704b. In other words, the screen 522 displays the lines 706a, 706b around the market data values that correspond to the cells that are identified within the inside market lines 704a, 704b. As a result, a user can associate the market data displayed on the screen 522 with certain cells in the trading interface 508 by using the inside market lines 704a, 704b and the lines 706a, 706b as reference points, for example.

In some examples, the trading device 502 communicates with the OHMD 504 through the network 700. For example, as the cells of the trading interface 508 are scrolled up or down (e.g., via the scroll buttons 526, 528), the inside market lines 704a, 704b shift up or down. The trading device 502 communicates with the OHMD 504 through the network 700 to instruct the OHMD to display the lines 706a, 706b the same, so that the user can match the market data with the corresponding cells on the trading interface 508. Additionally or alternatively, the OHMD 504 may detect the inside market lines 704a, 704b via the camera 524 of and automatically display the lines 706a, 706b in the corresponding location on the screen 522. In the illustrated example, the inside market lines 704a, 704b define the inside market. However, in other examples, other lines or indicators may be utilized on the trading interface 508 and a corresponding line(s) or indicator(s) may likewise be displayed on the screen 522.

In some examples, to enable the user to correlate market data in certain cells, one or more cells in the trading interface 508 may be highlighted and the corresponding market data on the screen 522 is also highlighted. For example, the user may select (e.g., by touching or hovering over the screen 506 with his/her finger, via a stylus, via a keyboard on the trading device 502) the screen 506 to highlight cells 708, 710 on the trading interface 508. In response, the trading device 502 communicates the request through the network 700 to the OHMD 504 to highlight the corresponding market data values of the cells 708, 710 (e.g., 92 and 96375) on the screen 522. In the illustrated example, the values on the screen 522 are enlarged and highlighted with a border or edge (e.g., emphasized). Therefore, the user can recognize which value(s) on the screen 522 corresponds to which cells on the trading interface 508 of the trading device 502. In some examples, the OHMD 504 detects (via the camera 524) the highlighting of the one or more cells on the trading interface 508, retrieves the corresponding market data values from the network 700, and highlights the corresponding market data values on the screen 522 for the user to identify the market data values that correspond to the highlighted cell of the trading interface 508.

In some examples, instead of obfuscating the market data from the trading interface 508 by removing the values completely, an indicator or code may be displayed. The indicator or code may be similar to the network indicator 702. For example, a QR code may be displayed in a cell of the trading interface 508, and the camera 524 may detect the QR code and interpret the code as a certain value and present the market data on the screen 522. In some examples, the QR code identifies a source or location of where the market data value is to be retrieved (e.g., via the network 700).

Figure 8:
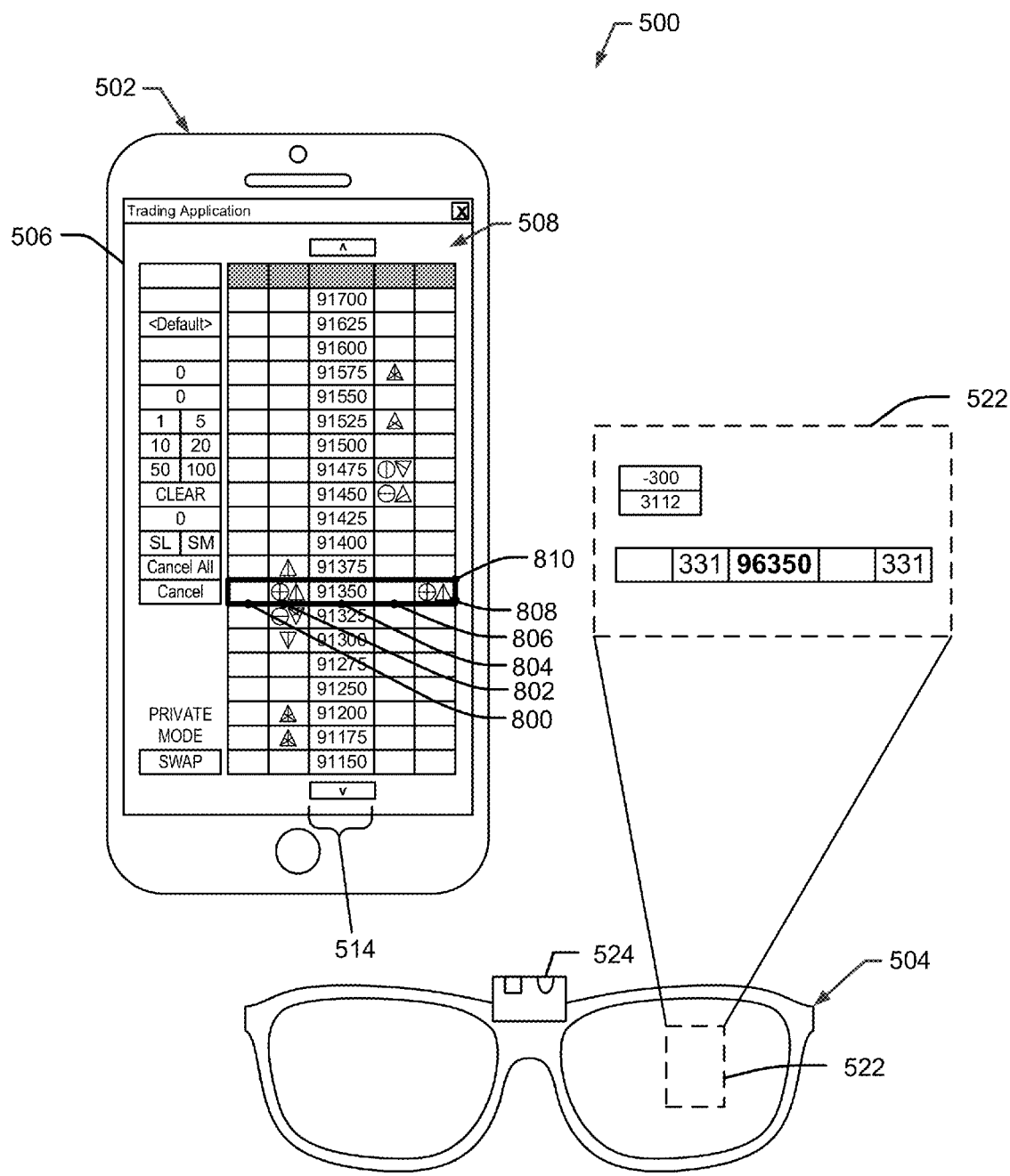
FIG. 8 illustrates the example privacy system of FIG. 5 presenting obfuscated market data in another alternative example.

In the illustrated example of FIG. 8, the example trading device 502 and the example OHMD 504 are not in communication with each other. In this example, the OHMD 504 uses an integral algorithm to interpret symbols or graphics on the trading interface 508. Similar the example illustrated in FIG. 6, the trading interface 508 includes values in the value column 514 so that the user can recognize the relation of the corresponding cells on the screen 522. Additionally, similar to the example illustrated in FIG. 6, the values in the value column 514 are obfuscated. In this example, each of the values is adjusted by 5000. In other words, each of the values presented in the value column 514 is 5000 less than the correct value. Therefore, when viewed by other people in proximate area, only the incorrect values are visible on the trading device 502.

In some examples, the adjustment factor is set (e.g., predetermined) by the user. For example, the user may select to have the values in the value column 514 represented as 5000 less than the correct market data values. Therefore, when the user is viewing the values in the value column 514 on the trading device 502, the user understands the correct values associated with the values in the value column 514 (e.g., by adding 5000 to the values). In some examples, this adjustment factor is programmed into the OHMD 504, so that when displaying the values in any of the cells of the value column 514, the OHMD 504 adds back in 5000 to display the values correctly on the screen 522 to the user.

In the illustrated example, the privacy system 500 obfuscates the market data in the cells of the trading interface 508 using symbols. The symbols may be any dynamic or static graphic, icon, character, letter, number, pictogram, color, gradient, altered textual string, QR code and/or URL. To indicate which cells of data are to be displayed on the screen 522, one or more cells in the trading interface 508 may be highlighted and detected by the OHMD 504 via the camera 524. For example, cells 800, 802, 804, 806, 808 (e.g., a row) have been highlighted on the trading interface 508 and an edge or border 810 is displayed around the cells 800-808 on the trading interface 508. The camera 522 of the OHMD 504 detects the border 810 and interprets the symbols within the cells 800-808 that have been highlighted for display. The cells 800-808 may be highlighted by the user (e.g., via touching, via a stylus, via a keyboard). In other examples, other types of highlighting (e.g., color, shading, etc.) are may be used to indicate the selection.

In some examples, the trading interface 508 utilizes a color gradient to indicate to the user where the matching market data corresponds. For example, the cells at the bottom of the trading interface 508 may be shaded dark blue, and the cells at the top of the trading interface 508 may be shaded dark red, and the cells between the top and the bottom are incrementally shaded between blue and red. In response, the screen 522 displays the market data values and also includes the colored cells on the screen 522, so that the user can match up the coloring of the cells on the trading interface 508 with the colors of the market values on the screen 522. In some examples, the lens 520 and/or the screen 522 of the OHMD 504 are color tinted, and the color gradient may appear differently when viewed through the OHMD 504.

Figure 9:
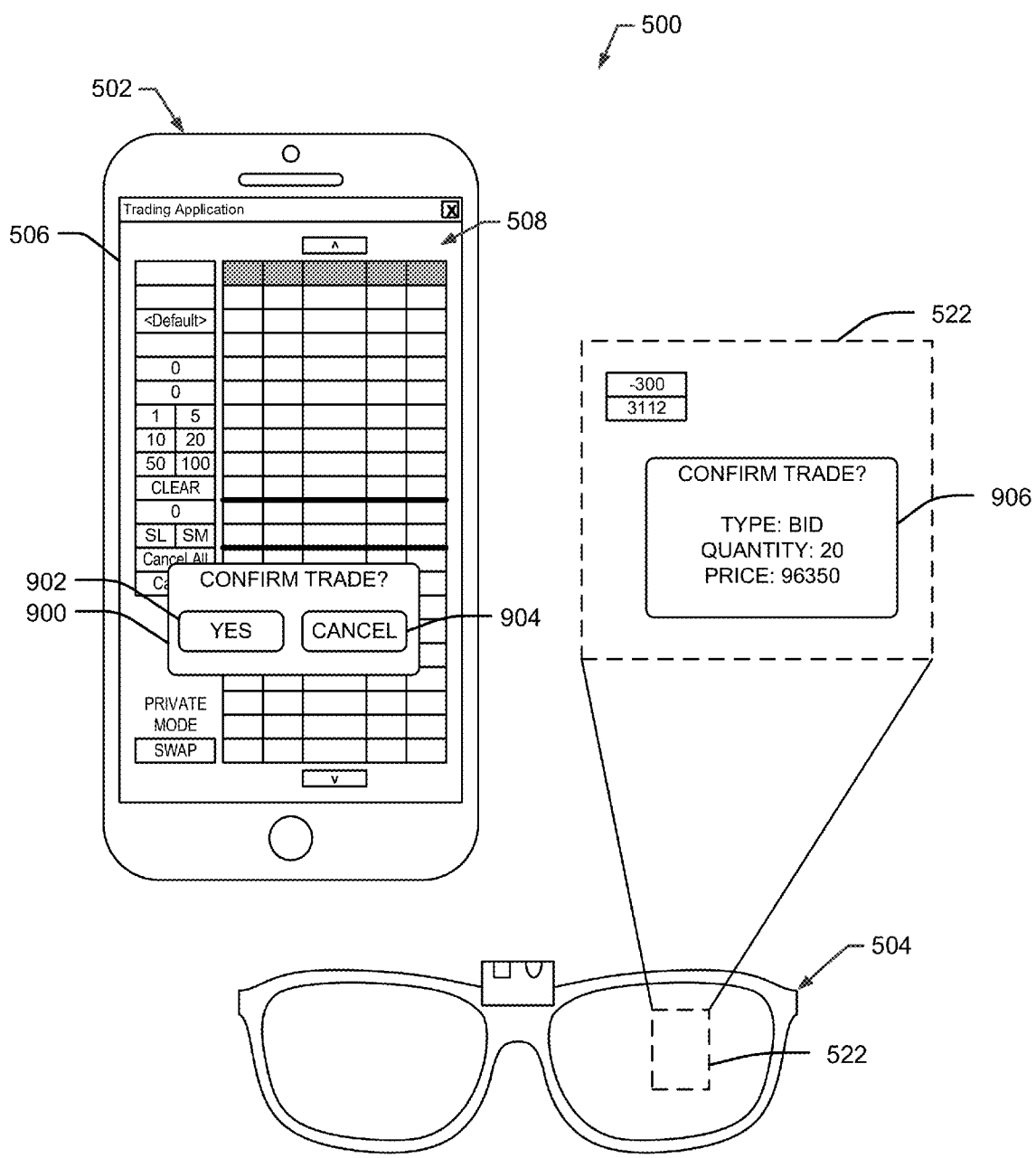
FIG. 9 illustrates the example privacy system of FIG. 5 presenting obfuscated market data in another alternative example.

In some examples, the privacy system 500 includes a confirmation, which prevents the user from inadvertently (e.g., by accidently touching the screen 506) placing orders on the trading interface 508 because the market data and/or other information is obfuscated. For example, in some instances an order may be placed by a single selection of one of the cells on the trading interface 508. However, when in the privacy mode, a portion of the market data and/or other information on the trading interface 508 may be obfuscated (e.g., not displayed and/or otherwise not legible to an unaided human eye) and the user may accidently place an order unintentionally. Therefore, in the illustrated example of FIG. 9, a confirmation window 900 (e.g., a menu, a window pane, a screen, a box) appears when an order for a tradable object is to be placed (e.g., entered). The confirmation window 900 is displayed on the screen 506 so that the user can recognize that an order is about to be placed. The example confirmation window 900 includes a first button 902 YES to confirm and place the order and a second button 904 CANCEL to cancel the order.

In some examples, the screen 522 displays a confirmation information window 906 when the confirmation window 900 is displayed on the trading interface 508. In some examples, the confirmation information window 906 includes additional information about the proposed order that is not displayed on the screen 506 of the trading device 502. Therefore, other people in the proximity of the trading device 502 are prevented from seeing the details of the potential order. For example, the confirmation information window 906 indicates that the order is a bid, for a quantity of twenty (20), at a price of 96350. In some examples, the OHMD 504 obtains this data from one or more symbols presented on the confirmation window 900. In other examples, such as in the examples of FIGS. 5-7, the trading device 502 may communicate directly with the OHMD 504. The confirmation information window 906 may include more or fewer parameters about the potential order. In some examples, the same information may also be displayed on in the confirmation window 900.

Figure 10:
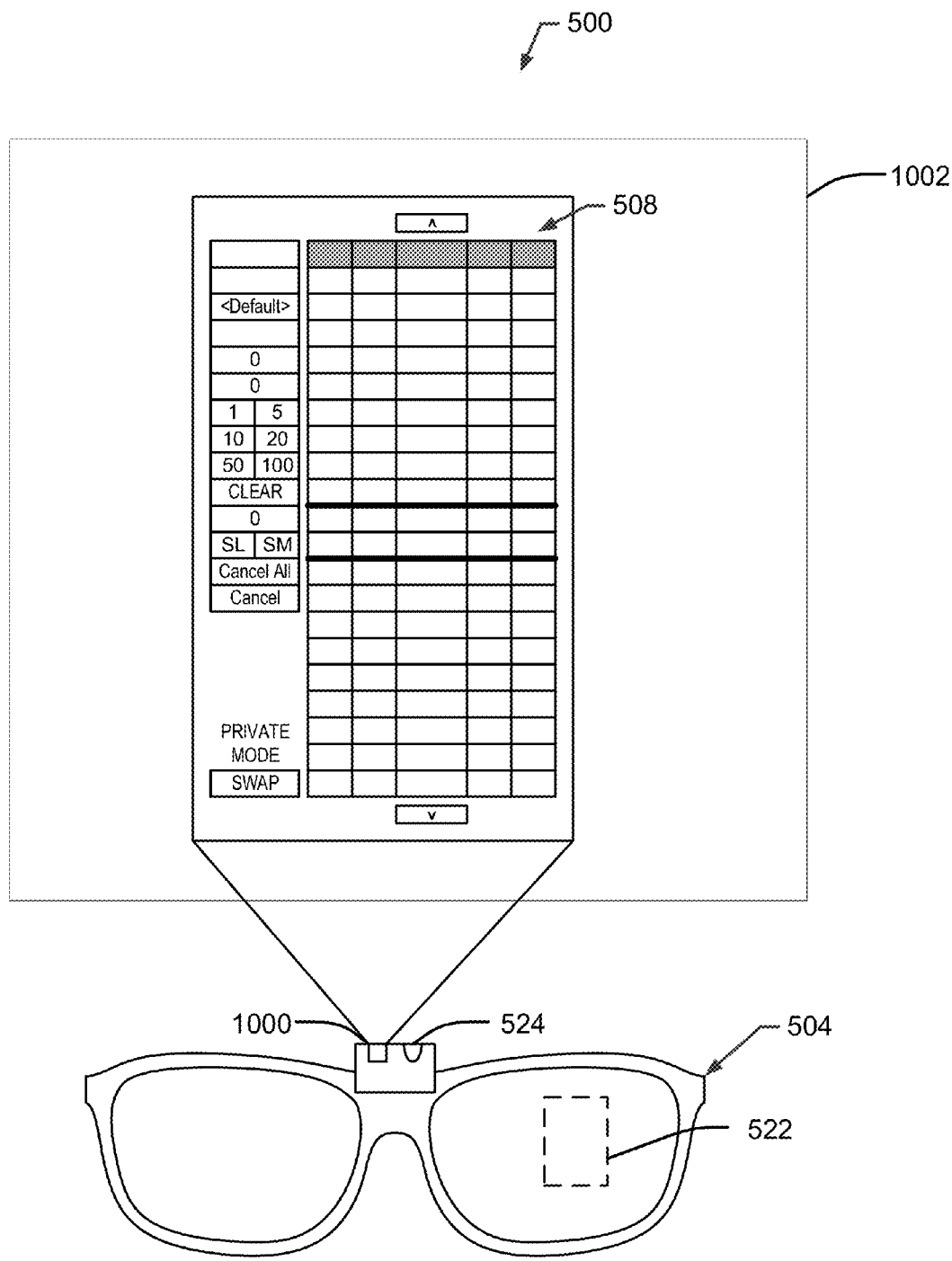
FIG. 10 illustrates the example privacy system of FIG. 5 presenting obfuscated market data in another alternative example.

In the illustrated example of FIG. 10, the OHMD 504 includes a projector 1000 to display the trading interface 508 on a surface such as, for example, a wall 1002. Similar to any of the examples of FIGS. 5-9, the trading interface 508 is displayed with the cells or outline of the ladder with at least a portion of the market data obfuscated. The OHMD 504 displays the market data on the screen 522 to the user. In some examples, when the user views the trading interface 508 on the wall 1000 through the lens 520, the market data aligns (e.g., similar to the examples of FIG. 5) within the cells of the trading interface 508. The camera 524 may be used to detect the position, location and/or orientation of the trading device 508 on the wall 1002, and the OHMD 504 may adjust the size, spacing and/or location of the market data values on the screen 522 to align with the trading interface 508. As such, the trading interface 508 and the market data values align and appear as normal. In other examples, the screen 522 and the trading interface 508 are not aligned. Instead, one or more of the cells on the trading interface 508 may be selected or highlighted and the corresponding market data value(s) may be displayed on the screen 522 to the user. For example, the camera 524 may detect the user's hand or finger in front of one or more of the cells and may display and/or highlight the corresponding market data on the screen 522. The camera 524 may also detect input via a pen, laser pointer and/or other suitable tools, for example. The user may interact with the trading interface 508 displayed on the wall 1002 similar to that on the trading device 502. In other words, the projector 1000 and the camera 524 operate as a trading device.

Any of the features, functions and advantages of the example privacy system 500 disclosed in FIGS. 5-10 may be achieved independently in various embodiments or may be combined in other embodiments.

Figure 11:
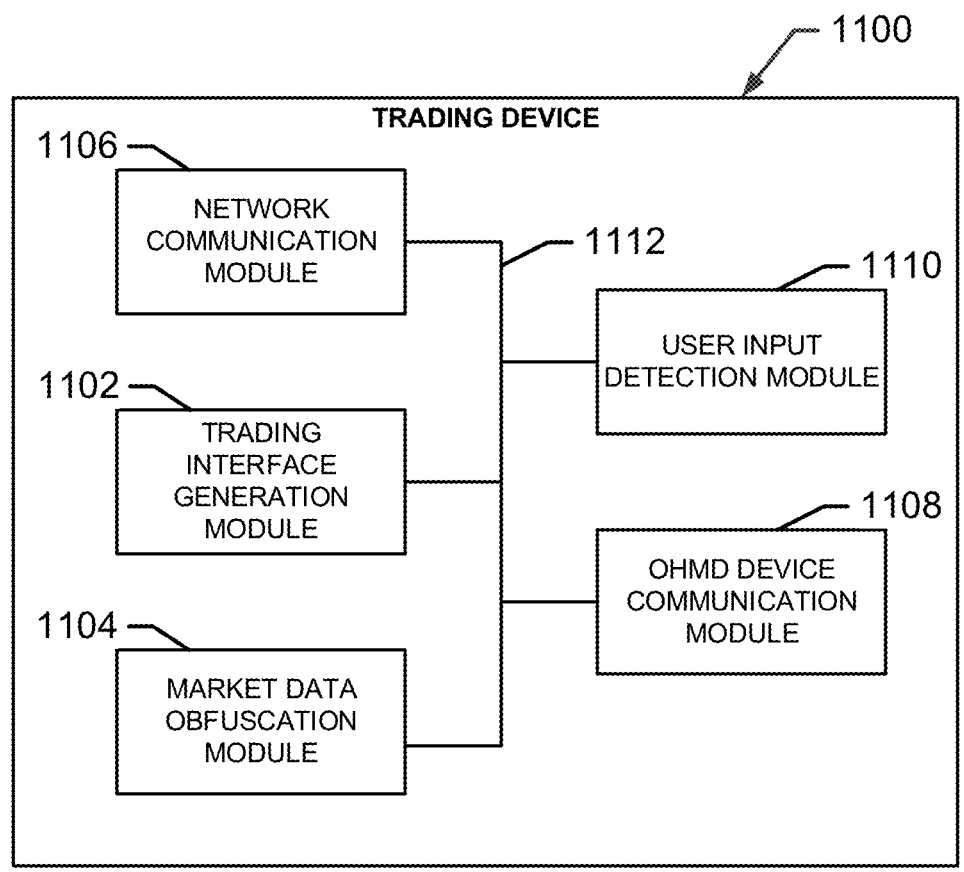
FIG. 11 illustrates a block diagram of an example trading device to implement the example trading device of the example privacy system of FIG. 5.

FIG. 11 is a block diagram of an example trading device 1100 that may be used to implement the example trading device 504 of FIGS. 5-10. The example trading device 1100 includes a trading interface generation module 1102 to generate a trading interface such as, for example, the trading interface 508 of FIGS. 5-10. The trading interface may include any layout or design to present market data and/or other information to a user. In some examples, the trading interface is to be displayed on a screen of the trading device. In other examples, such as in the examples of FIG. 10, the trading interface 508 is presented on a surface (e.g., the wall 1002) via the projector 1000.

The trading device 1100 of FIG. 11 includes a market data obfuscation module 1104 to obfuscate at least a portion of the market data. The market data may be obfuscated by removing or not displaying a market data value (e.g., similar to the examples in FIG. 7), by converting a market data value into one or more symbols (e.g., similar to the examples in FIG. 8), by altering or adjusting a value of the market data (e.g., similar to the values in the value column 514 in FIGS. 6 and 8) and/or by presenting the market data value(s) in any other form that has been altered from its normal display. In some examples, the market data obfuscation module 1104 is preset with certain factors for converting or manipulating market data. For example, in FIGS. 6 and 8, the values in the value column 514 are offset or adjusted by a certain factor, which may be predetermined by the user.

In some examples, the trading device 1100 operates between a private mode, where the market data obfuscation module 1104 is to obfuscate the market data, and a normal mode, where the trading interface generation module 1102 is to present or display the market data as normal. The trading device 1100 may include a button or switch for manually switching back-and-forth between the private mode (e.g., when the user is in a public setting) and the normal mode. For example, in the examples of FIG. 6, the trading device 502 includes the button 604 to switch back-and-forth between a private mode and a normal mode. Additionally or alternatively, in some examples this determination is performed automatically. For example, the trading device 1100 may transmit one or more signals (e.g., a ping) to identify if other electronic devices (e.g., cell phones, tablets, etc.) are in a proximity (e.g., within a threshold proximity). In some examples, a signal is transmitted at a certain increment of time to constantly monitor for other electronic devices. In some examples, the trading device 1100 may monitor for signals (e.g., cell phone signals, data signals, etc.) that are transmitted from other electronic devices nearby. If a threshold number of devices (e.g., 1 device, 4 devices, etc.) is detected, the trading device 1100 automatically switches to the private mode and the market data obfuscation module is to obfuscate the market data. If the threshold number of devices is not detected, the trading device may switch or remain in the normal mode.

The trading device 1100 includes a network communication module 1106 to enable the trading device system 1100 to communicate and interact with a network such as, for example, an internet website, a platform and/or a server. The network communication module 1106 retrieves market data from the network that is to be presented (e.g., in an obfuscated form) by the trading interface generation module 1102. The network communication module 1106 also enables a user to interact with the network to, for example, place orders with an exchange. For example, in the examples of FIG. 7, the network 700 provides market data and other information to the trading device 502 and enables the trading device 502 to communicate with the OHMD 504.

In the illustrated example, the trading device 1100 includes an OHMD device communication module 1108 to communicate with an OHMD (e.g., a private interface). In some examples, the trading device system 1100 is to communicate the market data, which may be obfuscated, to an OHMD to be presented to a user. For example, when in the private mode, the trading device 1100 may communicate the obfuscated market data to the OHMD device via the OHMD device communication module. Additionally or alternatively, the OHMD device communication module 1108 communicates other commands or requests from the trading device 1100 to an OHMD. For example, if certain cells are highlighted or selected on the trading interface, the OHMD device communication module 1108 communicates with the OHMD device to display and/or highlight the corresponding market data values. For example, in the examples of FIG. 6, the cell 602 is selected or highlighted on the trading interface 508, and the trading device 502 communicates with the OHMD 504 to highlight the market data corresponding to the cell 602 on the screen 522.

The example trading device 1100 includes a user input detection module 1110 to detect input from a user. In some examples, a user may interact with the trading device 1100 by touching (e.g., via tactile selection) a screen or display of the trading interface. In other examples, user input may be in the form of a selection from a stylus. In other examples, a user may hover his/her finger over an area on the trading interface. The user input detecting module 1110 detects or identifies these commands and/or requests by the user and communicates them to, for example, a network via the network communication module 1106. For example, a user may place an order for a tradable object by selecting the tradable object market data on the trading interface. In some examples, the user input detection module 1110 receives input from a user regarding the mode. For example, the user may manually select between operating the trading device 1100 in the private mode or in the public mode.

The example trading device 1100 modules 1102-1110 are communicatively coupled to other components of the example trading device 1100 via communication links 1112. The communication links 1112 may be any type of wired connection (e.g., a databus, a USB connection, etc.) or a wireless communication mechanism (e.g., radio frequency, infrared, etc.) using any past, present or future communication protocol (e.g., Bluetooth, USB 2.0, USB 3.0, etc.). Also, the components of the example system 1100 may be integrated in one device or distributed over two or more devices.

Figure 12:
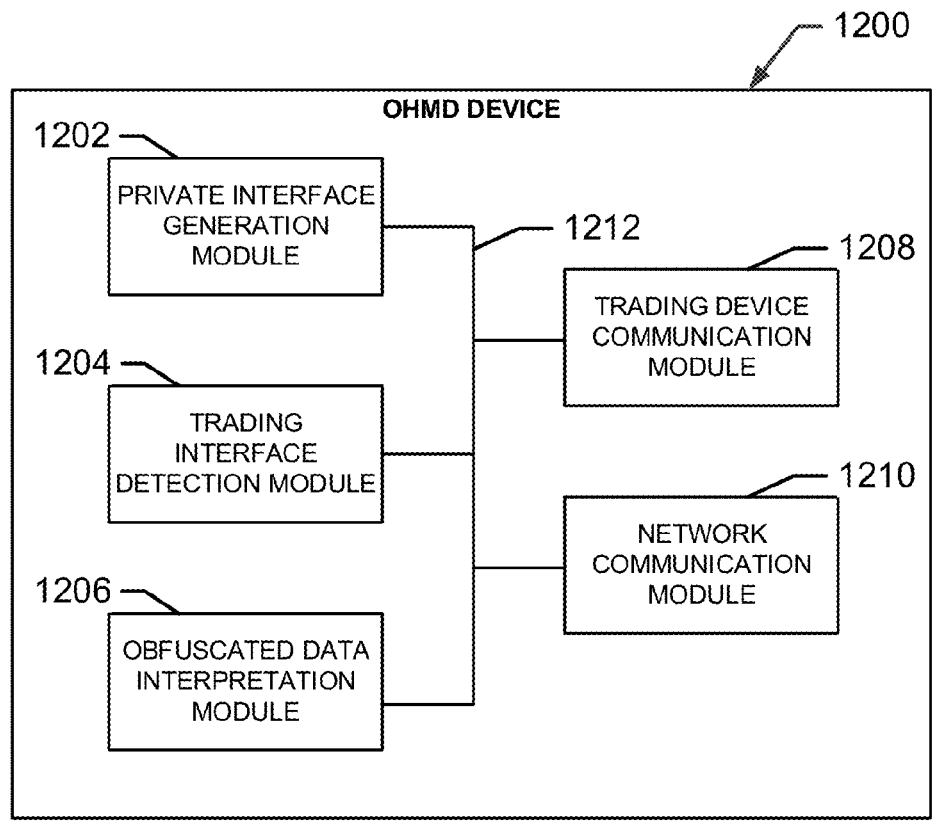
FIG. 12 illustrates a block diagram of an example optical head mounted display (OHMD) device to generate the example private interface of the example privacy system of FIG. 5.

FIG. 12 is a block diagram of an example OHMD device 1200 that may be used to implement the example OHMD 504 of FIGS. 5-10. The example OHMD device 1200 includes a private interface generation module 1202 to present and display information (e.g., market data) to a user. The example private interface generation module 1202 generates (e.g., formats and/or configures) the market data values to be displayed to a user via a private interface. In some examples, the market data is displayed on a screen on a lens that is worn by the user. For example, the OHMD 504 of FIGS. 5-10 includes the screen 522 on the lens 520 to display market data and/or other information to the user wearing the OHMD 504. The market data may be displayed in multiple formats and may include additional indicators or signifiers (e.g., highlighting, coloring, shading, etc.) for associating the market data on the screen 522 with the trading interface 508 on the trading device 502.

The example OHMD device 1200 of FIG. 12 includes a trading interface detection module 1204 to detect or identify a trading interface. In some examples, a camera is utilized to identify features of a trading interface. For example, in FIG. 5, the OHMD 504 detects that the cell 602 of the trading interface 508 is highlighted, via the camera 524. In some examples, the trading interface detection module 1204 detects the position, location and/or orientation of trading interface or the trading device upon which the trading interface is provided.

In the illustrated example, the OHMD device 1200 includes an obfuscated data interpretation module 1206 to interpret data (e.g., market data) that has been obfuscated on a trading interface. In some examples, a market data value is obfuscated on a trading interface by removing or not displaying (e.g., suppressing) the market data value, by altering the value of the data and/or by converting the data into one or more symbols (e.g., a dynamic or static graphic, icon, character, letter, number, pictogram, color, gradient, altered textual string, QR code and/or a URL). The obfuscated data interpretation module 1206 may interpret the obfuscated data such that the correct data may be presented to the user via the private interface generation module 1202. For example, in FIG. 6, the values in the value column 514 have been obfuscated by removing the first two digits of the values. The OHMD 504 detects these values in the value column 514 and interprets the values (e.g., by adding the first two digits back onto the values) to present the correct values to the user via the screen 522. In some examples, a trading interface displays the market data as one or more symbols (e.g., a dynamic or static graphic, icon, character, letter, number, pictogram, color, gradient, altered textual string, QR code and/or a URL), and the obfuscated data interpretation module 1206 interprets the symbol(s) (e.g., via an integrated algorithm). For example, in examples of FIG. 8, the market data is obfuscated on the trading interface 508 by displaying the market data values as one or more symbols (e.g., a string of symbols). The OHMD 504 includes an integral processor with an algorithm that can interpret the symbols, so that the corresponding market data may be presented to the user via the screen 522.

The example OHMD device 1200 of FIG. 12 includes a trading device communication module 1208 to communicate with a trading device such as, for example, the trading device 502 and/or 1100 of FIGS. 5-11. In some examples, OHMD device system 1200 receives market data, commands, and/or other information directly from a trading device. For example, in FIG. 6, the trading device 502 communicates the market data to the OHMD 504 (e.g., via Bluetooth, and/or WiFi).

In some examples, the OHMD 1200 operates between a private mode and a normal mode, and the OHMD device 1200 presents market data (via the private interface generation module 1202) when the OHMD device 1200 is in the private mode. As disclosed herein, a trading device (e.g., the trading device 502, the trading device 1100) may operate between a private mode and a normal mode. The mode may be switched manually and/or automatically. In some examples, the OHMD device 1200 may detect when the trading device is operating in a private mode by detecting an indication on the trading interface via the trading interface detection module 1204. For example, in the examples of FIG. 6, the OHMD device 504 may detect that the trading device 502 is in the private mode by detecting the mode indicator 606 (e.g., via optical recognition from the camera 524). In some examples, if the OHMD device 1200 is operating in a normal mode, the OHMD device 1200 does not present any market data to the user.

In the illustrated example, the OHMD device 1200 includes a network communication module 1210 to enable the OHMD device 1200 to communicate and interact with a network such as, for example, an internet website, a platform or a server. The network communication module 1210 retrieves market data from the network. In some examples, a trading device communicates with the OHMD device system 1200 through the network. In some examples, a network is identified by the OHMD device system 1200 using a camera and a network indicator. For example, in examples of FIG. 7, the network indicator 702 is detected and interpreted by the camera 524 of the OHMD 504 to identify what network to communicate with. The trading device 502 may be retrieving market data from a particular website, for example, and the network indicator 702 may indicate the same website to the OHMD 504, so that the OHMD 504 is able to retrieve the corresponding market data.

The example trading device 1200 modules 1202-1210 are communicatively coupled to other components of the example system 1200 via communication links 1212. The communication links 1212 may be any type of wired connection (e.g., a databus, a USB connection, etc.) or a wireless communication mechanism (e.g., radio frequency, infrared, etc.) using any past, present or future communication protocol (e.g., Bluetooth, USB 2.0, USB 3.0, etc.). Also, the components of the example OHMD device 1200 may be integrated in one device or distributed over two or more devices.

Figure 13:
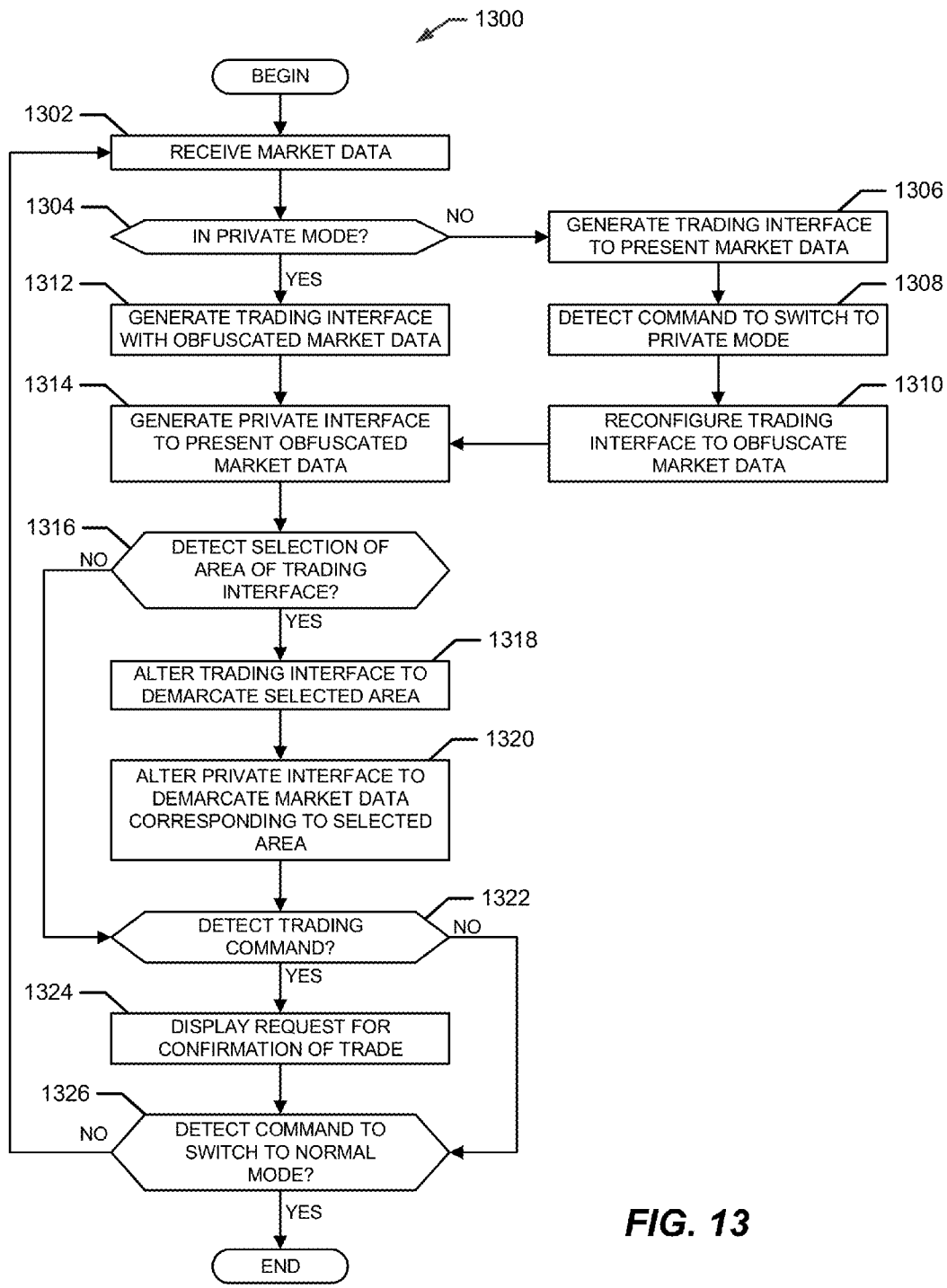
FIG. 13 illustrates a flow diagram for an example method or process to present obfuscated information.

FIG. 13 illustrates a flow diagram of an example process or method 1300 to generate and/or present obfuscated market data to a user. The example method 1300 may be performed by the privacy system 500 of FIG. 5-11, the trading device 1100 of FIG. 11 and/or the OHMD device 1200 of FIG. 12 to implement any of the examples disclosed herein. The example method 1300 includes receiving market data (block 1302). Market data may be received from one or more exchanges at a trading device (e.g., a first computing device). Market data feed generally includes the price, order, and fill information for an individual tradable object, for example. In an embodiment, the market data feed provides the highest bid price (HBP) and the lowest ask price (LAP) for a tradable object, referred to as the "inside market," in addition to the current bid and ask prices and quantities in the market, referred to as "market depth." Some exchanges provide an infinite market depth, while others provide no market depth or only a few prices away from the inside market. The number of market data feeds received may depend on the number of tradable objects selected for spread trading by a user, or alternatively, some or all of the data feeds from an exchange are received and only those tradable objects which are part of the spread are traded. The market data information is represented as nodes and edges on a selectable graph interface (e.g., the price ladder of the trading interface 508). The user can facilitate a trade by selected a node and/or edge in the displayed graph.

The example method 1300 includes detecting or determining whether a privacy system (e.g., a trading device and/or a private interface) is in a private mode (block 1304). In some examples, a trading device includes a button or switch for manually switching back-and-forth between the private mode (e.g., a public mode) and a normal mode. For example, in the examples of FIG. 6, the trading device 502 includes the button 604 to switch back-and-forth between a private mode and a normal mode. Additionally or alternatively, in some examples this determination is performed automatically. For example, a trading device may transmit one or more signals (e.g., a ping) to identify if other electronic devices (e.g., cell phones, tablets, etc.) are in a proximity (e.g., within a threshold proximity). In some examples, a signal is transmitted at a certain increment of time to constantly monitor for other electronic devices. If a threshold number of devices (e.g., 1 device, 4 devices, etc.) is detected, the trading device automatically switches to the private mode. If the threshold number of devices is not detected, the trading device may switch or remain in the normal mode.

If not in a private mode, the example method 1300 includes generating a trading interface to present market data (block 1306). A trading interface may be, for example, similar to the trading interface 400 of FIG. 4 and/or the trading interface 508 of FIGS. 5-10. In some examples, a trading interface includes a price ladder or price tree having a plurality of cells (e.g., areas of the trading interface) forming a grid of columns and rows to present market data. In the private mode, the market data may be displayed, visibly, by a trading device, such that any person in the proximity of the trading device can view the corresponding market data.

The example method 1300 includes detecting a command to switch to a private mode (block 1308). As disclosed, in some examples, a trading device may be manually switched to a private mode. In other examples, this operation may be performed automatically. When switched to a private mode, the example method 1300 includes reconfiguring the trading interface to obfuscate market data (block 1310). Similarly, if the privacy system was previously in the private mode (block 1304), the method 1300 includes generating the trading interface with obfuscated market data (block 1312). The market data may be obfuscated by removing or not displaying a market data value (e.g., similar to the examples in FIG. 7), by converting a market data value into one or more symbols (e.g., similar to the examples in FIG. 8), by altering or adjusting a value of the market data (e.g., similar to the values in the value column 514 in FIGS. 6 and 8) and/or by presenting the market data value(s) in any other form that has been altered from its normal display.

The example method 1300 includes generating a private interface to present the obfuscated market data (block 1314). In some examples, the private interface is displayed on a screen of an OHMD. The OHMD may include, for example, a lens with the screen that only the wearer or user can view. As such, other people in the proximity of the user are unable to view the market data displayed on the screen of the OHMD. For example, in FIGS. 5-10, the OHMD 504 may be worn by a user and includes a lens 520 with a screen 522 for displaying market data to the user.

In some examples, the private interface presents all or a portion of the market data that has been obfuscated on the trading interface. In some examples, an OHMD device detects or receives the obfuscated market data from a trading device and interprets the data to be presented to the user. In some examples, the market data to be displayed is transmitted from the trading device. Additionally or alternatively, the market data may be retrieved from a network (e.g., the network 700 of FIG. 7). In some examples, an OHMD includes a camera or other detection device to detect symbols on the trading interface and interprets the symbols (e.g., via an integrated algorithm) into market data to be presented to the user.

The example method 1300 includes detecting a selection of an area of the trading interface (block 1316). To enable a user to understand how the market data on the private interface corresponds to the obfuscated data on the trading interface, one or more areas (e.g., cells) on the trading interface may be selected or highlighted. In some examples, a user may interact with the trading interface by touching (e.g., via his/her finger, via a stylus) a screen of a device that the trading interface is displayed. In some examples, a trading device includes a plurality of buttons (e.g., a keyboard, direction arrow buttons) to interact with the trading interface. In some examples, the trading interface is projected onto a surface, and a camera detects a position of the user's hand or finger and determines which area(s) to select. For example, in examples of FIG. 10, the OHMD 504 includes the projector 1000 to project the trading interface 508 on the wall 1002, and the camera 524 may determine which cells of the trading interface 508 are to be selected by detecting a position of the user's hand or finger in front of the projected trading interface 508.

If an area of the trading interface is selected, the example method 1300 includes altering the trading interface to demarcate the selected area (block 1318). In some examples, the area of the trading interface is demarcated by highlighting the area with, for example, a color, a shading and/or a border around the selected area. For example, in the examples of FIG. 6, the cell 602 is displayed as highlighted in a different shade on the trading interface 508. In the example of FIG. 8, the cells 800-808 have been selected and the border 810 is provided around the cells 800-808 to indicate that the cells 800-808 have been selected.

The example method 1300 includes altering the private interface to demarcate market data corresponding to the selected area (block 1320), which enables the user to understand or recognize the market data presented on the private interface corresponds to the obfuscated data on the trading interface. In some examples, the private interface presents or displays a corresponding highlighting (e.g., a color, a shading and/or border around the market data that associated with the selected area of the trading interface). For example, in FIG. 6, the value (e.g., 92) that corresponds to the cell 602 is highlighted via shading on the screen 522. In FIG. 7, the values (e.g., 92, 96375) are displayed on the screen 522 with a border or edge and are enlarged, which emphasizes the market data values relative to the other values. Therefore, a user can recognize which market data value(s) correspond to the selected area (e.g., cell) on the training interface 508.

The example method 1300 includes detecting a trading command (block 1322). A trading command may be a command to buy or sell a quantity of a tradable object, for example. In some examples, a user may place or enter a trading command by selecting an area of the trading interface. For example, in the trading interface 508 of FIG. 6, a user may select cell 602 to place an order to sell the tradable object to the offer to buy the tradable object.

The example method 1300 includes displaying a request for confirmation of the trade (block 1324). In some examples, the request for confirmation is provided as an additional step to prevent a user from accidently placing a trade order (e.g., when the market data and/or other information is obfuscated on the trading interface). For example, in FIG. 9, the confirmation window 900 is displayed before placing a trading order and requests confirmation from the user to place the trading order. This additional step prevents a user from inadvertently placing a trading order (or a wrong trading order) unintentionally. Additionally or alternatively, in some examples the private interface displays confirmation information relating to the trading order. The confirmation information may include additional information that is not displayed on the trading interface, for example. In the illustrated example of FIG. 9, the confirmation information window 906 on the screen 522 includes additional information (e.g., the type of order, the quantity and the price) relating to the trading order that is to be placed. In some examples, this information is also displayed on the trading interface 508.

The example method 1300 includes detecting if there is a command to switch to a normal mode (block 1326). If commanded, the example method 1300 returns to receiving the market data (block 1302) and generating the trading interface in accordance with the example method 1300.

Figure 14:
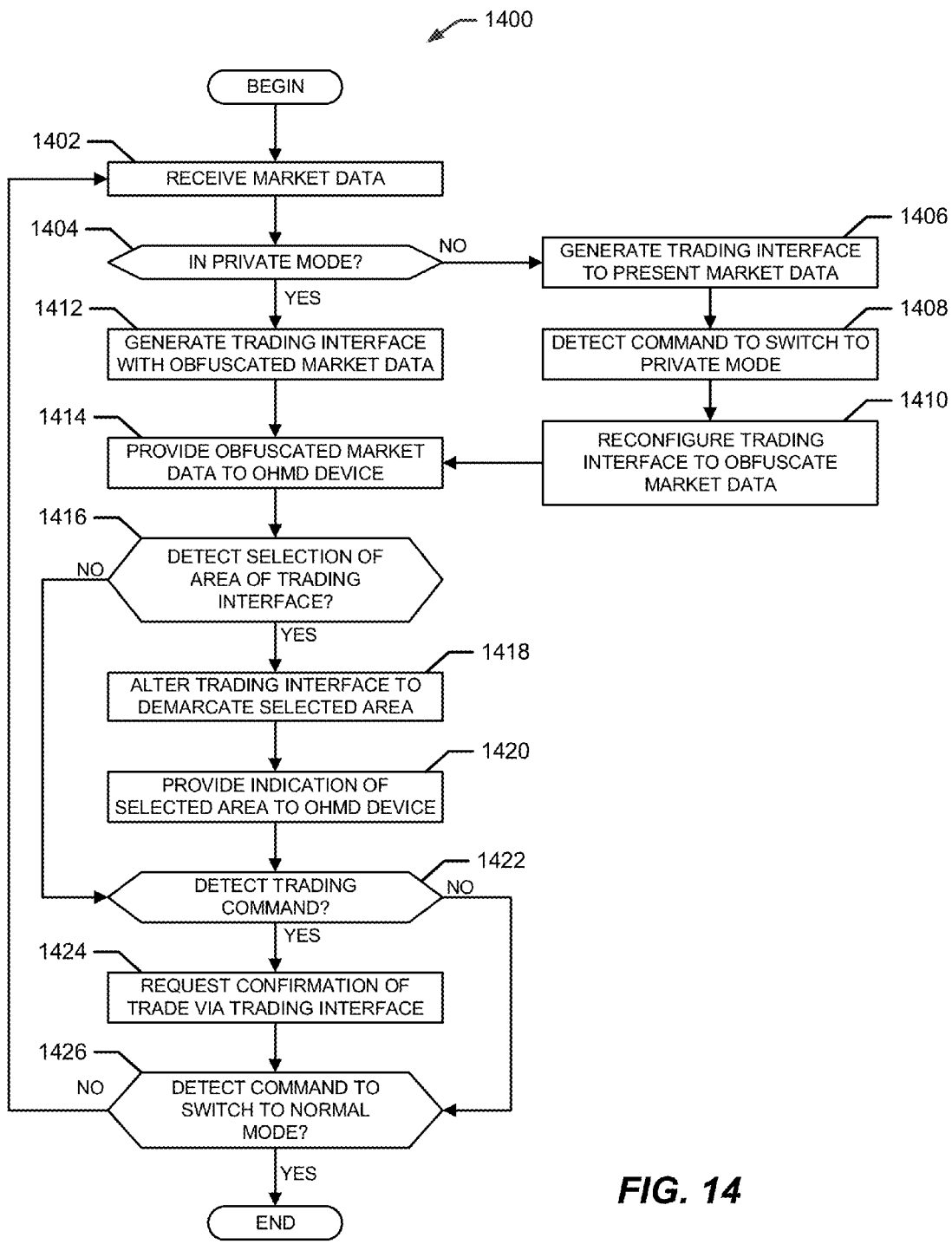
FIG. 14 illustrates a flow diagram for another example method or process to present obfuscated information.

FIG. 14 illustrates a flow diagram of an example process or method 1400 to generate and/or present obfuscated market data to a user. The example method 1400 may be performed by trading device 502 of FIGS. 5-10 and/or the trading device 1100 of FIG. 11 to implement any of the examples disclosed herein. In some examples, one or more of elements of the method 1400 may be combined or implemented with one or more elements of the method 1300 such as, for example, those elements performed by the trading device. The example method 1400 includes receiving market data (block 1402). The market data may be received (block 1402) similar to the market data (block 1302) received in the example method 1300.

The example method 1400 includes detecting or determining whether a privacy system is in a private mode (block 1402). If not in a private mode, the example method 1400 includes generating a trading interface to present market data (block 1406), detecting a command to switch to the private mode (block 1408) and reconfiguring the trading interface to obfuscate market data (block 1410). If in the private mode (block 1404), the method 1400 includes generating the trading interface with obfuscated market data (block 1414). The example steps (blocks 1404-1412) in the method 1400 may be similar to the example steps (blocks 1304-1312) of the example method 1300 of FIG. 13.

The example method 1400 of FIG. 14 includes providing the obfuscated market data to an OHMD device (block 1414) (e.g., to be presented in the private interface). In some examples, market data is communicated (e.g., transferred, sent, transmitted) from a trading device to the OHMD. For example, in the examples of FIG. 6, the trading device 502 communicates market data to the OHMD 504 (e.g., via a wireless connection). In some examples, market data and/or other information (e.g., commands, instructions, etc.) are provided through a network to the OHMD device. For example, in the examples of FIG. 7, the trading device 502 and the OHMD 504 are in communication with the network 700, and the trading device 502 communicates with the OHMD 504 through the network 700.

The example method 1400 includes detecting a selection of an area of the trading interface (block 1416) and altering the trading interface to demarcated the selected area (block 1418) if an area of the trading interface is selected, which may be similar to the example steps (block 1316 and 1318) disclosed in the example method 1300 of FIG. 13.

The example method 1400 includes providing the indication of the selected area to the OHMD device (block 1420). The indication of the selected area may be communicated from a trading device to the OHMD device (e.g., directly, via a network). In some examples, displaying or presenting the demarcated area on the trading interface communicates the indication to the OHMD device. For example, in FIG. 6, the cell 602 is highlighted and the camera 524 of the OHMD 504 may detect (e.g., via the camera 524) the highlighting and identify the selected cell 602. As such, the indication is provided to the OHMD 504 by displaying the demarcated area on the trading interface 508.

The example method 1400 includes detecting a trading command (block 1422), which may be similar to detecting a trading commanded (block 1322) as disclosed in the example method 1300 of FIG. 13. The example method 1400 includes requesting confirmation of the trade via the trading interface (block 1424). In some examples, the request for confirmation is provided as an additional step to prevent a user from accidently placing a trade order via the trading interface (e.g., when the market data and/or other information is obfuscated on the trading interface). For example, in FIG. 9, the confirmation window 900 is displayed on the trading interface 508 before placing a trading order. The confirmation window 900 requests confirmation from the user to place the trading order. If the user does not confirm or accept the order, the trading interface 508 does not place or enter the order. This additional confirmation helps prevent a user from inadvertently placing a trading order (or a wrong trading order). In other examples, additional information relating to the trading order is displayed on the trading interface (e.g., the type of trade, the quantity, the price, etc.).

The example method 1400 includes detecting if there is a command to switch to a normal mode (block 1426). If commanded, the example method 1400 includes receiving the market data (block 1402) and generating the trading interface in accordance with the example method 1400.

Figure 15:
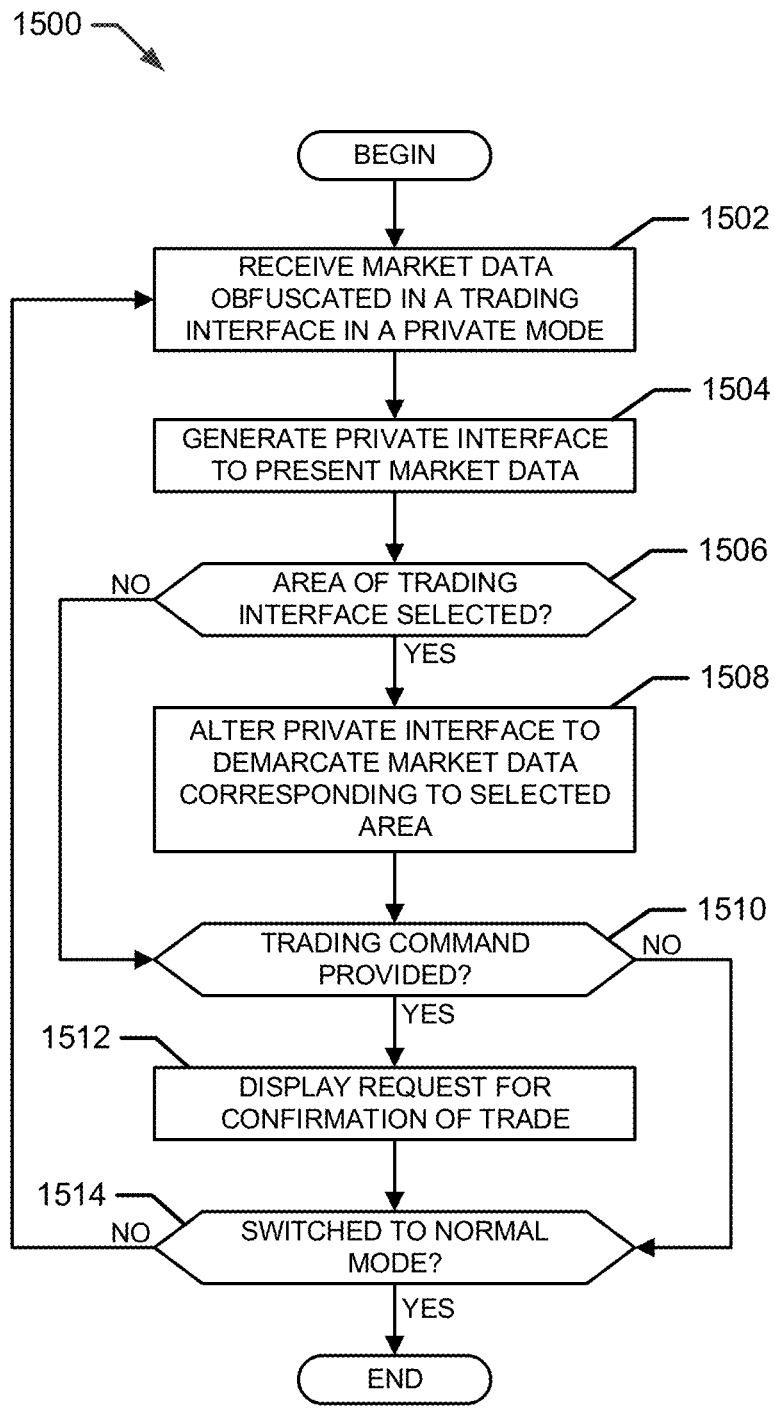
FIG. 15 illustrates a flow diagram for another example method or process to present obfuscated information.

FIG. 15 illustrates a flow diagram of an example process or method 1500 to generate and/or present obfuscated market data to a user. The example method 1500 may be performed by the OHMD 504 of FIGS. 5-10 and/or the OHMD device 1200 of FIG. 12 to implement any of the examples disclosed herein. In some examples, one or more of elements of the method 1500 may be combined or implemented with one or more elements of the method 1300 such as, for example, those elements performed by the OHMD. The example method 1500 includes receiving market data that is obfuscated in a trading interface in a private mode (block 1502). In some examples, obfuscated market data is received by an OHMD device (e.g., to be presented on the private interface) from a trading device and/or through a network that is communication with the trading device. In some examples, obfuscated market data is received by an OHMD device via a camera and detection software that enables the OHMD device to identify and interpret obfuscated market data. For example, in the examples of FIG. 8, the OHMD 504 identifies and interprets symbols displayed in the trading interface 508. The symbols may be one or more of a dynamic or static graphic, icon, character, letter, number, pictogram, color, gradient, altered textual string, QR code and/or a URL.

The example method 1500 includes generating a private interface to present market data (block 1504). The private interface may be implemented as an OHMD, for example. In some examples, an OHMD includes a lens with a screen that only the wearer or user can view. As such, other people in the proximity of the user are unable to view the market data. For example, in FIGS. 5-10, the OHMD 504 may be worn by a user and includes a lens 520 with a screen 522 for displaying market data to the user. The screen 522 is disposed on an inner surface of the lens 520, so that only the wearer is capable of seeing the contents of the screen 522.

The example method 1500 includes determining if an area of the trading interface is selected (block 1506) (e.g., demarcated). In some examples, the identification of a selected area on the trading interface is communicated from the trading device to the OHMD device. For example, in the examples of FIG. 6, the trading device 502 may communicate (e.g., via Bluetooth) a message to the OHMD 504 that the cell 602 has been selected. In some examples, the OHMD device detects if an area has been selected (e.g., via optical recognition by a camera). The OHMD device identifies highlighting (e.g., a coloring, a shading and/or a border) in the trading interface. For example, in FIG. 6, the OHMD 504 may detect the selected cell 602 via the camera 524.

If an area of the trading device has been selected, the example method 1500 includes altering the private interface to demarcate market data corresponding to the selected area (block 1508), which enables the user to understand or recognize the market data presented on the private interface corresponds to the obfuscated data on the trading interface. In some examples, the private interface presents or displays a corresponding highlighting such as, for example, a coloring, a shading and/or a border around the market data that is associated with the selected area of the trading interface. For example, in FIG. 6, the value (e.g., 92) that corresponds to the cell 602 is highlighted via shading on the screen 522. In FIG. 7, the values (e.g., 92, 96375) are displayed on the screen 522 with a border or edge and are enlarged, which emphasizes the market data values relative to the other values. As such, a user can recognize or understand that the highlighted market value corresponds to the selected area or cell of the training interface 508.

The example method 1500 includes detecting a trading command (block 1510). A trading command may be a command to buy or sell a quantity of a tradable object, for example. In some examples, a user may place or enter a trading command by selecting an area of the trading interface on a trading device, and the trading device communicates the trade request to the OHMD device. In other examples, the OHMD device may detect a window (e.g., a confirmation window) on the trading interface, via a camera, and determine that a trading command has been provided.

If a trading command is provide, the example method 1500 includes displaying a request for confirmation of the trade (block 1512). In some examples, the request for confirmation is provided to help prevent a user from accidently placing a trade order (e.g., when the market data and/or other information is obfuscated on the trading interface). For example, in the illustrated example of FIG. 9, the confirmation information window 906 is displayed on the screen 522, which indicates that a trading order is ready to be placed pending the confirmation. In some examples, the request for confirmation includes additional information (e.g., the type of order, the quantity and the price) relating to the trading order that is to be placed.

The example method 1500 includes determining if a privacy system has been switched to a normal mode (block 1514). If the privacy system is still in private mode, the method 1500 continues to receive the obfuscated market data (block 1302) and generate a private interface to present the market data (block 1504). If switched to a normal mode (block 1514), a privacy system may cease presenting market data on a private interface (e.g., because the market data is displayed on a trading device as normal).

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A method comprising:
   receiving, at a first computing device, market data related to a tradeable object;
   displaying, by the first computing device, a trading interface according to the market data;
   receiving, by the first computing device from a user of the first computing device, a privacy command to reconfigure the trading interface;
   in response to receiving the privacy command, reconfiguring, by the first computing device, the trading interface from a first mode to a second mode; and
   in response to reconfiguring the trading interface to the second mode:

obfuscating, by the first computing device, at least a portion of the market data from the market data displayed by the trading interface, where the at least a portion of the market data is not displayed by the first computing device in the second mode;

receiving, by a second computing device, the at least a portion of the market data; and generating, by the second computing device, a private interface to present the at least a portion of the market data.

2. The method of claim 1, wherein the second computing device comprises an optical head mounted display to render the private interface.

3. The method of claim 1, further comprising projecting, by the first computing device, the trading interface onto a surface to present the trading interface.

4. The method of claim 1, wherein the first computing device obfuscates the at least a portion of the market data when the trading interface is in the second mode by suppressing display of the at least a portion of the market data in the trading interface.

5. The method of claim 1, wherein in response to reconfiguring the trading interface to the second mode, the first computing device further displays a symbol comprising at least one of a Quick Response (QR) code, a uniform resource locator (URL), a pictogram, a color, a gradient, or an altered textual string to represent the at least a portion of the market data.

6. The method of claim 5, wherein the second computing device receives the at least a portion of the market data in response to interpreting the displayed symbol captured via a camera of the second computing device.

7. The method of claim 5, wherein the second computing device receives the at least a portion of the market data by retrieving the at least a portion of the market data from a remote source identified by the symbol.

8. The method of claim 1, wherein the second computing device receives the at least a portion of the market data via a transmission from the first computing device.

9. The method of claim 1, further comprising:
detecting, by the first computing device from the user of the first computing device, a trading command to execute a trade associated with the tradeable object, the trading command being detected when the trading interface is in the second mode; and
displaying, by at least one of the first computing device or the second computing device, a request for confirmation of the trade in response to the trading command.

10. The method of claim 1, further comprising:
detecting, by the first computing device, a selection command supplied by the user to select an area of the trading interface when in the second mode;
in response to receiving the selection command:
altering, by the first computing device, the trading interface to visually demarcate the area of the trading interface; and
altering, by the second computing device, the private interface to visually demarcate a selected portion of the at least a portion market data associated with the area.

11. The method of claim 1, wherein the first computing device is a mobile device.

12. The method of claim 1, wherein the first computing device is a trading device.

13. The method of claim 1, wherein the second computing device is a wearable computing device.

14. The method of claim 1, further comprising aligning the private interface generated by the second computing device with the trading interface generated by the first computing device.

15. A system comprising:
a first computing device including a first processor and a first memory, the first processor configured to execute first instructions stored on the first memory to:
receive market data related to a tradeable object;
display a trading interface according to the market data; and
receive, from a user, a privacy command to reconfigure the trading interface;
in response to receiving the privacy command, reconfigure the trading interface from a first mode to a second mode and to obfuscate at least a portion of the market data from the market data displayed by the trading interface, where the at least a portion of the market data is not displayed by the first computing device in the second mode; and
a second computing device including a second processor and a second memory, the second processor configured to execute second instructions stored on the second memory to:
receive the at least a portion of the obfuscated market data; and
generate a private interface to present the at least a portion of the market data.

16. The system of claim 15, wherein the second computing device comprises an optical head mounted display to render the private interface.

17. The system of claim 15, wherein the first instructions, when executed, further cause the first computing device to project the trading interface onto a surface to present the trading interface.

18. The system of claim 15, wherein the at least a portion of the market data is obfuscated when the trading interface is in the second mode by suppressing display of the at least a portion of the market data.

19. The system of claim 15, wherein the first processor is further configured to execute first instructions stored on the first memory to display a symbol comprising at least one of a Quick Response (QR) code, a uniform resource locator (URL), a pictogram, a color, a gradient, or an altered textual string to represent the at least a portion of the market data.

20. The system of claim 19, wherein the second computing device receives the at least a portion of the market data by interpreting the displayed symbol captured via a camera of the second computing device.

21. The system of claim 19, wherein the second computing device receives the at least a portion of the market data by retrieving the at least a portion of the market data from a remote source identified by the symbol.

22. The system of claim 15, wherein the second computing device receives the at least a portion of the market data via a transmission from the first computing device.

23. The system of claim 15, wherein the first instructions, when executed, further cause the first computing device to detect a trading command to execute a trade associated with the trading object when the trading interface is in the second mode; and
wherein at least one of:
the first instructions, when executed, further cause the first computing device to display a request for confirmation of the trade in response to the trading command, or the second instructions, when executed, further cause the second computing device to display the request for confirmation of the trade in response to the trading command.

24. The system of claim 15, wherein the first instructions, when executed, further cause the first computing device to:
  detect a selection command supplied by the user to select an area of the trading interface when in the second mode; and
  in response to receiving the selection command, alter the trading interface to visually demarcate the area of the trading interface; and
  wherein the second instructions, when executed, further cause the second computing device to alter the private interface to visually demarcate a selected portion of the at least a portion of the market data associated with the area in response to the selection command.

25. The system of claim 15, wherein the first computing device is a mobile device.

26. The system of claim 15, wherein the first computing device is a trading device.

27. The system of claim 15, wherein the second computing device is a wearable computing device.

28. The system of claim 15, further comprising aligning the private interface generated by the second computing device with the trading interface generated by the first computing device.

29. A tangible computer readable storage medium comprising:
  first instructions that, when executed, cause a first computing device to at least:
    receive market data related to a tradeable object;
    display a trading interface according to the market data;
    receive, from a user, a privacy command to reconfigure the trading interface; and
    in response to receiving the privacy command, reconfigure the trading interface from a first mode to a second mode and to obfuscate at least a portion of the market data from the market data displayed by the trading interface, where the at least a portion of the market data is not displayed by the first computing device in the second mode; and
  second instructions that, when executed, cause a second computing device to at least:
    receive the at least a portion of the obfuscated market data; and
    generate a private interface to present the at least a portion of the market data.

30. The tangible computer readable storage medium as defined in claim 29, wherein the second computing device comprises an optical head mounted display to render the private interface.

31. The tangible computer readable storage medium as defined in claim 29, wherein the first instructions, when executed, further cause the first computing device to project the trading interface onto a surface to present the trading interface.

32. The tangible computer readable storage medium as defined in claim 29, wherein the at least a portion of the market data is obfuscated when the trading interface is in the second mode by suppressing display of the at least a portion of the market data.

33. The tangible computer readable storage medium as defined in claim 29, wherein the first instructions that, when executed, further cause the first computing device to display a symbol comprising at least one of a Quick Response (QR) code, a uniform resource locator (URL), a pictogram, a color, a gradient, or an altered textual string to represent the at least a portion of the market data.

34. The tangible computer readable storage medium as defined in claim 33, wherein the second computing device receives the at least a portion of market data by interpreting the displayed symbol captured via a camera of the second computing device.

35. The tangible computer readable storage medium as defined in claim 33, wherein the second computing device receives the at least a portion of the market data by retrieving the at least a portion of the market data from a remote source identified by the symbol.

36. The tangible computer readable storage medium as defined in claim 29, wherein the second computing device receives the at least a portion of the market data via a transmission from the first computing device.

37. The tangible computer readable storage medium as defined in claim 29, wherein the first instructions, when executed, further cause the first computing device to detect a trading command to execute a trade associated with the trading object when the trading interface is in the second mode; and
  wherein at least one of:
    the first instructions, when executed, further cause the first computing device to display a request for confirmation of the trade in response to the trading command, or
    the second instructions, when executed, further cause the second computing device to display the request for confirmation of the trade in response to the trading command.

38. The tangible computer readable storage medium as defined in claim 29, wherein the first instructions, when executed, further cause the first computing device to:
  detect a selection command supplied by the user to select an area of the trading interface when in the second mode; and
  in response to receiving the selection command, alter the trading interface to visually demarcate the area of the trading interface; and
  wherein the second instructions, when executed, further cause the second computing device to alter the private interface to visually demarcate a selected portion of the at least a portion of the market data associated with the area in response to the selection command.

39. The tangible computer readable storage medium as defined in claim 29, wherein the first computing device is a mobile device.

40. The tangible computer readable storage medium as defined in claim 29, wherein the first computing device is a trading device.

41. The tangible computer readable storage medium as defined in claim 29, wherein the second computing device is a wearable computing device.

42. The tangible computer readable storage medium as defined in claim 29, wherein the second instructions, when executed, further cause the second computing device to align the private interface generated with the trading interface generated by the first computing device.

* * * * *